United States Patent
Li et al.

(10) Patent No.: US 12,318,688 B2
(45) Date of Patent: Jun. 3, 2025

(54) CLOUD APPLICATION-BASED RESOURCE TRANSFER METHOD AND APPARATUS, AND COMPUTER DEVICE AND STORAGE MEDIUM

(71) Applicant: TENCENT TECHNOLOGY (SHENZHEN) COMPANY LTD, Guangdong (CN)

(72) Inventors: Huorong Li, Shenzhen (CN); Songjian Wang, Shenzhen (CN); Kexiao Duan, Shenzhen (CN); Ruizhou Wu, Shenzhen (CN); Cheng Yang, Shenzhen (CN); Weijian Li, Shenzhen (CN); Xin Chen, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 376 days.

(21) Appl. No.: 17/890,558

(22) Filed: Aug. 18, 2022

(65) Prior Publication Data

US 2022/0401833 A1 Dec. 22, 2022

Related U.S. Application Data

(63) Continuation of application No. PCT/CN2021/100115, filed on Jun. 15, 2021.

(30) Foreign Application Priority Data

Jul. 9, 2020 (CN) .......................... 202010656432.3

(51) Int. Cl.
*A63F 13/792* (2014.01)
*A63F 13/352* (2014.01)

(52) U.S. Cl.
CPC .......... *A63F 13/352* (2014.09); *A63F 13/792* (2014.09); *A63F 2300/403* (2013.01)

(58) Field of Classification Search
CPC .............................. A63F 13/792; A63F 13/352
See application file for complete search history.

(56) References Cited

U.S. PATENT DOCUMENTS

| 11,288,735 | B1 * | 3/2022 | Kao | .................. G06Q 30/0617 |
| 11,449,920 | B1 * | 9/2022 | Adams | .................... A63F 13/35 |

(Continued)

FOREIGN PATENT DOCUMENTS

| CN | 109151068 A | 1/2019 |
| CN | 111151011 A | 5/2020 |
| CN | 111818164 A | 10/2020 |

OTHER PUBLICATIONS

Translation of CN109161068 (Year: 2019).*

(Continued)

*Primary Examiner* — Jay Trent Liddle
(74) *Attorney, Agent, or Firm* — Sughrue Mion, PLLC

(57) ABSTRACT

A cloud application-based resource transfer method, apparatus, computer device and storage medium. The method includes: displaying, through a cloud application, a video interface generated after processing through a cloud; displaying, in response to a trigger operation on a target visual element in the video interface used for triggering resource transfer, a resource transfer channel interface generated by the cloud; displaying a target resource transfer channel in the resource transfer channel interface; displaying resource transfer-related information corresponding to the target resource transfer channel and generated by the cloud; and triggering, in response to a resource transfer confirmation operation for the resource transfer-related information, a resource transfer operation that is based on the resource (Continued)

transfer-related information through the target resource transfer channel.

20 Claims, 9 Drawing Sheets

(56) References Cited

U.S. PATENT DOCUMENTS

2012/0289188 A1    11/2012  Marcus et al.
2017/0076262 A1     3/2017  Xing
2017/0326456 A1*   11/2017  Kawaguchi ........... A63F 13/822
2022/0410016 A1*   12/2022  Chien .................... A63F 13/71

OTHER PUBLICATIONS

International Search Report for PCT/CN2021/100115, dated Sep. 6, 2021.
Written Opinion for PCT/CN2021/100115, dated Sep. 6, 2021.
Extended European Search Report issued Aug. 21, 2023 in Application No. 21837661.4.

* cited by examiner

CLOUD APPLICATION-BASED RESOURCE TRANSFER METHOD AND APPARATUS, AND COMPUTER DEVICE AND STORAGE MEDIUM

CROSS-REFERENCE TO RELATED APPLICATION(S)

This application is a continuation application of International Application No. PCT/CN2021/100115, filed on Jun. 15, 2021, which claims priority to Chinese Patent Application No. 202010656432.3, filed with the China National Intellectual Property Administration on Jul. 9, 2020, the disclosures of which are incorporated by reference in their entireties.

FIELD

The present disclosure relates to the field of computer technologies, and in particular, to a cloud application-based resource transfer method and apparatus, a computer device, and a storage medium.

BACKGROUND

A cloud application refers to an application in which a terminal interacts with a cloud, and is an innovative application of connecting to and manipulating a remote server cluster through the Internet or a local area network, to complete a service logic or an operation task. A running manner of the cloud application is to encode a running process into an audio and video stream through a powerful computing power of a cloud simulator, and transmit the audio and video stream to a mobile phone end through a network, to interact with a user.

A resource transfer operation of the cloud application is also performed at the cloud. However, because a resource transfer application required for resource transfer is not installed at the cloud, the cloud cannot invoke the resource transfer application to complete the resource transfer operation, and resource transfer manners that can be used at the cloud are limited.

SUMMARY

A cloud application-based resource transfer method, performed by a terminal, may be provided, the method including: displaying, through a cloud application, a video interface generated after processing through a cloud; displaying, in response to a trigger operation on a target visual element in the video interface used for triggering resource transfer, a resource transfer channel interface generated by the cloud; displaying a target resource transfer channel in the resource transfer channel interface; displaying resource transfer-related information corresponding to the target resource transfer channel and generated by the cloud; and triggering, in response to a resource transfer confirmation operation for the resource transfer-related information, a resource transfer operation that is based on the resource transfer-related information through the target resource transfer channel.

A cloud application-based resource transfer apparatus may be provided, the apparatus including: a video interface display module, configured to display, through a cloud application, a video interface generated after processing through a cloud; a response module, configured to display, in response to a trigger operation on a target visual element in the video interface used for triggering resource transfer, a resource transfer channel interface generated by the cloud; a resource transfer channel display module, configured to display a target resource transfer channel in the resource transfer channel interface; an information display module, configured to display resource transfer-related information corresponding to the target resource transfer channel and generated by the cloud; and a resource transfer module, configured to trigger, in response to a resource transfer confirmation operation for the resource transfer-related information, a resource transfer operation that is based on the resource transfer-related information through the target resource transfer channel.

A computer device may be provided, the computer device including a memory and one or more processors, the memory storing computer-readable instructions, the computer-readable instructions, when executed by the processor, causing the processor to perform the operations of the foregoing cloud application-based resource transfer method.

One or more non-transitory readable storage media may be provided, the one or more non-transitory readable storage medium storing computer-readable instructions, the computer-readable instructions, when executed by one or more processors, causing the one or more processors to perform the operations of the foregoing cloud application-based resource transfer method.

DESCRIPTION OF EMBODIMENTS

Figure 1:
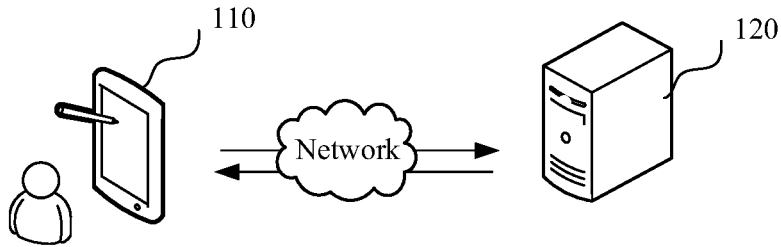
FIG. 1 is a diagram of an application environment of a cloud application-based resource transfer method according to some embodiments.

A cloud application-based resource transfer method provided may be applied to an application environment shown in FIG. 1. A cloud 120 transmits a video interface to a cloud application through a first cloud connection channel between the cloud and the cloud application. A terminal 110 displays, through the cloud application, a video interface generated after processing through the cloud. The terminal 110 displays, in response to a trigger operation on a target visual element in the video interface used for triggering resource transfer, a resource transfer channel interface generated by the cloud. The terminal 110 displays a target resource transfer channel in the resource transfer channel interface. The cloud 120 feeds resource transfer-related information corresponding to the target resource transfer channel back to the cloud application cloud through a second cloud connection channel. The terminal 110 displays the resource transfer-related information corresponding to the target resource transfer channel and generated by the cloud. The terminal 110 triggers, in response to a resource transfer confirmation operation for the resource transfer-related information, a resource transfer operation that is based on the resource transfer-related information through the target resource transfer channel. The terminal 110 communicates with the cloud 120 through a network. The cloud 120 is a server providing a cloud computing service, and may be implemented as an independent cloud server or implemented as a server cluster including a plurality of cloud servers. The terminal 110 may be, but is not limited to, a smartphone, a pad, a laptop, a desktop, a smart speaker, a smart watch, etc. The terminal and the cloud server may be directly or indirectly connected in a wired or wireless communication manner. This is not limited thereto.

Figure 2:
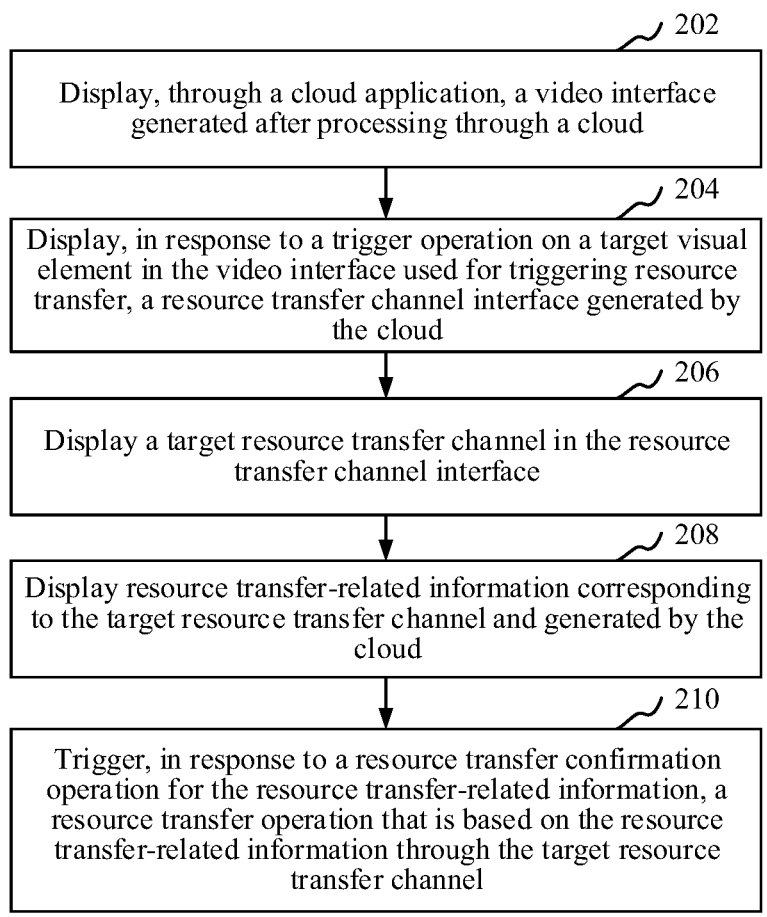
FIG. 2 is a schematic flowchart of a cloud application-based resource transfer method according to some embodiments.

In an embodiment, as shown in FIG. 2, a cloud application-based resource transfer method is provided, a description is made using an example in which the method is applied to the terminal in FIG. 1, and the method includes the following operations:

Operation 202. Display, through a cloud application, a video interface generated after processing through a cloud.

The cloud application refers to an application in which the terminal interacts with the cloud, and a running manner of the cloud application is to encode a running process into an audio and video stream through a powerful computing power of a cloud simulator, and transmit the audio and video stream to a mobile phone end through a network, to interact with a user. The cloud application may be any application running at the cloud. For example, the cloud application may be a cloud gaming application, a cloud instant messaging application, a cloud social networking site application, a cloud video application, a cloud sharing application, a cloud buying and selling application, or a cloud intelligent recognition application, but is not limited thereto.

Cloud gaming, also referred to as gaming on demand, is an online gaming technology based on the cloud computing technology. The cloud gaming technology enables a thin client with relatively limited graphics processing and data computing capabilities to run a high-quality game. In a cloud gaming scene, the game is run on the cloud server rather than a game terminal of a player, and the cloud server renders the game scene into a video and audio stream, and transmits the video and audio stream to the game terminal of the player by using the network. The game terminal of the player is not required to have powerful graphics computing and data processing capabilities, but only required to have a basic streaming media playback capability and the capability of acquiring instructions inputted by the player and sending the instructions to the cloud server.

The user logs in to the cloud application on the terminal through a user identifier, and the user identifier may be an account entered by the user when the user logs in to the cloud application, or may be a unique character string generated according to the account. The terminal loads, through the cloud application, an audio and video stream transmitted after processing through the cloud, and then displays, in the cloud application, a video interface generated according to the audio and video stream.

Operation 204. Display, in response to a trigger operation on a target visual element in the video interface used for triggering resource transfer, a resource transfer channel interface generated by the cloud.

The visual element refers to data that can be displayed and that is visual to human eyes, and is used to transfer information. The target visual element refers to an element that can trigger a particular event. For example, a resource transfer channel selection event is triggered through trigger of the target visual element. It may be understood that, different target visual elements may trigger different events. The target visual element may include one or a combination of more than one of a character, a picture, and an animated file. The trigger operation may be manners such as touch, touch and hold, tap, slide, and multi-touch. The resource transfer channel interface refers to an interface for displaying a candidate resource transfer channel or a target resource transfer channel. A resource transfer channel refers to a channel for resource transfer, for example, a payment channel such as WeChat Pay, Alipay, QQ Pay, Q coin Pay, bank card payment, direct debit, PayPal, okpay, paysafecard, shill, payza, perfectmoney, or molpoints, but is not limited thereto.

The user may trigger the visual element in a manner such as touch, touch and hold, tap, slide, or multi-touch in the video interface displayed through the cloud application. The terminal detects a trigger operation of the user, determines the visual element triggered by the user, and determines the visual element corresponding to the trigger operation as a target visual element. Then, the terminal may receive a resource transfer trigger event triggered by the trigger operation, and feed the resource transfer trigger event back to the cloud. After receiving the resource transfer trigger event fed back by the cloud application, the cloud generates the resource transfer channel interface according to the resource transfer trigger event, and transmits the resource transfer channel interface to the cloud application.

In this embodiment, the resource transfer channel interface may be embedded in the video interface and displayed. Alternatively, the resource transfer channel interface may be superimposed on the video interface and displayed. That is, the resource transfer channel interface is independent of the video interface.

Operation 206. Display a target resource transfer channel in the resource transfer channel interface.

The terminal displays at least one candidate resource transfer channel in the resource transfer channel interface. When one candidate resource transfer channel exists in the resource transfer channel interface, the one candidate resource transfer channel is determined as the target resource transfer channel. When at least two candidate resource transfer channels exist in the resource transfer channel interface, the target resource transfer channel may be determined based on a selection operation of the user. In addition, the target resource transfer channel is displayed in the updated resource transfer channel interface.

In this embodiment, the displaying a target resource transfer channel in the resource transfer channel interface includes:

displaying at least one candidate resource transfer channel in the resource transfer channel interface; and determining, in response to a selection operation on the at least one candidate resource transfer channel, a selected candidate resource transfer channel as the target resource transfer channel.

The terminal displays a resource transfer channel interface through the cloud application, and displays, in the resource transfer channel interface, at least one candidate resource transfer channel returned by the cloud. The user may select any candidate resource transfer channel on the resource transfer channel interface, and the terminal detects a selection operation of the user on the at least one candidate resource transfer channel, and determines a candidate resource transfer channel selected by the selection operation. The terminal determines the selected candidate resource transfer channel as a target resource transfer channel. Alternatively, the terminal feeds a resource transfer channel selection event triggered by the selection operation back to the cloud, and receives a target resource transfer channel fed back by the cloud after responding, to display the target resource transfer channel in the resource transfer channel interface.

Operation 208. Display resource transfer-related information corresponding to the target resource transfer channel and generated by the cloud.

After feeding the selected target resource transfer channel back to the cloud application, the cloud generates corresponding resource transfer-related information according to the target resource transfer channel, and returns the resource transfer-related information to the cloud application. The terminal receives the resource transfer-related information through the cloud application and displays the resource transfer-related information.

In this embodiment, the terminal receives the resource transfer-related information through the cloud application, and displays the resource transfer-related information in the video interface of the cloud application. Alternatively, the resource transfer-related information may be displayed in an independent interface.

In this embodiment, after determining the selected candidate resource transfer channel as the target resource transfer channel, the cloud application feeds the target resource transfer channel back to the cloud. The cloud receives the target resource transfer channel fed back by the cloud application, generates the resource transfer-related information according to the target resource transfer channel, and transmits the resource transfer-related information to the cloud application. The terminal receives the resource transfer-related information through the cloud application, and displays the resource transfer-related information in the video interface.

Operation 210. Trigger, in response to a resource transfer confirmation operation for the resource transfer-related information, a resource transfer operation that is based on the resource transfer-related information through the target resource transfer channel.

The user may perform the resource transfer confirmation operation for the resource transfer-related information displayed in the video interface, and after detecting the resource transfer confirmation operation, the terminal invokes the target resource transfer channel to trigger the resource transfer operation based on the resource transfer-related information, thereby performing the resource transfer operation through the target resource transfer channel.

In this embodiment, the terminal may trigger, by invoking a resource transfer application corresponding to the target resource transfer channel, the resource transfer operation based on the resource transfer-related information, to perform the resource transfer operation through the resource transfer application.

In the foregoing cloud application-based resource transfer method, the cloud processes the running process of the cloud application into an audio and video stream through the cloud computing, and displays the corresponding video interface through the cloud application, to implement interaction between the cloud and the user. When the user triggers the target visual element in the video interface used for triggering resource transfer, the cloud application feeds user operation information back to the cloud, so that the cloud generates the resource transfer channel interface, for the user to select the target resource transfer channel in the resource transfer channel interface. The cloud generates the corresponding resource transfer-related information according to the target resource transfer channel and returns the corresponding resource transfer-related information to the cloud application, so that the cloud can invoke the target resource transfer channel based on the cloud application to perform the resource transfer operation.

The conventional cloud can implement resource transfer only by using a resource transfer channel built in the cloud, but cannot invoke an external resource transfer channel. However, in this embodiment, the cloud can invoke, based on the cloud application, an external resource transfer channel and the resource transfer application not installed in the cloud to perform the resource transfer operation, thereby invoking the external resource transfer channel and the resource transfer application by the cloud. In addition, a plurality of resource transfer manners can be provided, so that resource transfer of the user in the cloud application scenario is not limited by the cloud scenario.

Figure 3:
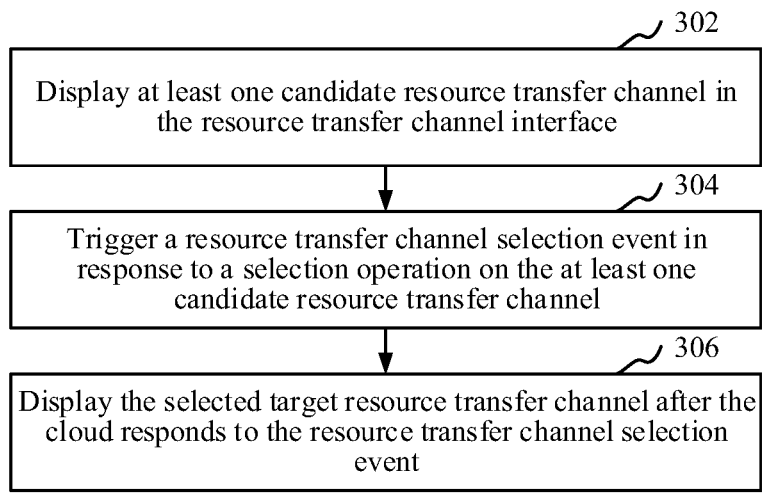
FIG. 3 is a schematic flowchart of an operation of displaying a target resource transfer channel in a resource transfer channel interface according to some embodiments.

In an embodiment, as shown in FIG. 3, the displaying a target resource transfer channel in the resource transfer channel interface includes:

Operation 302. Display at least one candidate resource transfer channel in the resource transfer channel interface.

After receiving a resource transfer trigger event fed back by the cloud application, the cloud obtains at least one candidate resource transfer channel according to the resource transfer trigger event. The cloud generates a resource transfer channel interface according to the at least one candidate resource transfer channel, and transmits the resource transfer channel interface and the at least one candidate resource transfer channel to the cloud application. The terminal displays the resource transfer channel interface on the video interface of the cloud application, and displays the at least one candidate resource transfer channel in the resource transfer channel interface.

Operation 304. Trigger a resource transfer channel selection event in response to a selection operation on the at least one candidate resource transfer channel.

The user may select any candidate resource transfer channel on the resource transfer channel interface, the terminal detects the selection operation of the user on the at least one candidate resource transfer channel, and the terminal may feed the resource transfer channel selection event triggered by the selection operation back to the cloud.

In this embodiment, the terminal may feed, through a development kit integrated in the cloud application, the resource transfer channel selection event triggered by the selection operation back to the cloud.

Operation 306. Display the selected target resource transfer channel after the cloud responds to the resource transfer channel selection event.

After receiving the resource transfer channel selection event fed back by the cloud application, the cloud determines, according to the resource the resource transfer channel selection event, the target resource transfer channel selected by the user, and feeds the target resource transfer channel back to the terminal.

In this embodiment, the terminal receives the target resource transfer channel fed back by the cloud, and displays the target resource transfer channel in the resource transfer channel interface. Alternatively, the terminal may display the target resource transfer channel in another interface independent of the resource transfer channel interface.

In this embodiment, a plurality of resource transfer channels are displayed in the resource transfer channel interface on the cloud application, and the user may autonomously select a required resource transfer manner. The cloud application feeds the event triggered by the selection operation of the user back to the cloud, so that the cloud can accurately determine, according to the triggered event, the resource transfer manner selected by the user, and the resource transfer manner selected by the user is displayed on the cloud application. Therefore, the user can implement resource transfer based on the cloud application to implement real-time interaction between the user operation and the cloud running.

In an embodiment, the displaying a target resource transfer channel in the resource transfer channel interface includes: displaying at least one candidate resource transfer channel in the resource transfer channel interface; and determining, in response to a selection operation on the at least one candidate resource transfer channel, a candidate resource transfer channel selected through the selection operation as the target resource transfer channel through a development kit integrated in the cloud application.

The development kit is a software development kit (SDK). The development kit used for resource transfer may be a resource transfer SDK, for example, a payment SDK used for payment.

The terminal displays a resource transfer channel interface through the cloud application, and displays, in the resource transfer channel interface, at least one candidate resource transfer channel returned by the cloud. The user may select any candidate resource transfer channel on the resource transfer channel interface, and the terminal detects the selection operation of the user on the at least one candidate resource transfer channel through the development kit integrated in the cloud application, and determines a candidate resource transfer channel selected by the selection operation. Then, the development kit integrated in the cloud application determines the candidate resource transfer channel selected by the selection operation as the target resource transfer channel.

In this embodiment, the development kit is integrated in the cloud application, to determine, through the development kit, the target resource transfer channel selected by the user in the resource transfer channel interface, thereby implementing real-time interaction between the cloud application and the user through the development kit for resource transfer.

In an embodiment, the triggering, in response to a resource transfer confirmation operation for the resource transfer-related information, a resource transfer operation that is based on the resource transfer-related information through the target resource transfer channel includes:

determining a resource transfer application corresponding to the target resource transfer channel in response to the resource transfer confirmation operation for the resource transfer-related information; and jumping from the cloud application to the resource transfer application, and transferring the resource transfer-related information into the resource transfer application, to cause the resource transfer application to perform the resource transfer operation based on the resource transfer-related information.

The terminal displays, in the video interface displayed through the cloud application, the resource transfer-related information of the target resource transfer channel. The user may perform resource transfer confirmation on the resource transfer-related information, to trigger the resource transfer operation. The terminal determines the resource transfer application corresponding to the target resource transfer channel after detecting the resource transfer confirmation operation of the user for the resource transfer-related information. Then, the terminal jumps from the cloud application to the resource transfer application, and transfers the resource transfer-related information into the resource transfer application. The resource transfer application performs the resource transfer operation based on the resource transfer-related information.

In this embodiment, after the resource transfer application completes the resource transfer operation, a resource transfer result is generated. The terminal returns from the resource transfer application to the cloud application, and transfers the resource transfer result into the cloud application, to feed the resource transfer result back to the cloud through the cloud application.

In this embodiment, after the user triggers the resource transfer confirmation operation, the resource transfer application is invoked through the cloud application to perform the resource transfer operation, so that the cloud can invoke the resource transfer application through the cloud application to complete the resource transfer operation. The cloud can use an internal resource transfer manner, and can invoke the external resource transfer application, so that the user can use resource transfer manners in various forms in the cloud application scenario.

Figure 4:
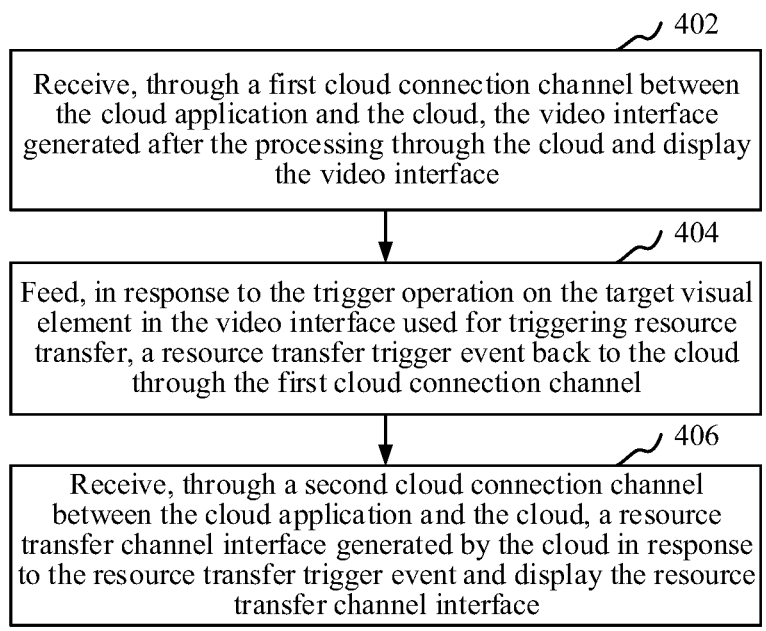
FIG. 4 is a schematic flowchart of displaying, through a cloud application, a video interface generated after processing through a cloud according to some embodiments.

In some embodiments, as shown in FIG. 4, the displaying, through a cloud application, a video interface generated after processing through a cloud may include:

Operation 402. Receive, through a first cloud connection channel between the cloud application and the cloud, the video interface generated after the processing through the cloud and display the video interface.

Data transmission between the cloud application and the cloud is implemented through the first cloud connection channel. The user logs in to the cloud application on the terminal through the user identifier, and the cloud application feeds login information of the user back to the cloud through the first cloud connection channel. The cloud receives, through the first cloud connection channel, the information fed back by the cloud application, and makes corresponding processing based on the fed-back information; and generates the video interface according to response information after the processing, and feeds the video interface back to the cloud application. The terminal receives, through the cloud application and the first cloud connection channel, the video interface generated after the processing through the cloud. Then, the terminal displays the video interface through the cloud application.

The displaying, in response to a trigger operation on a target visual element in the video interface used for triggering resource transfer, a resource transfer channel interface generated by the cloud includes:

Operation 404. Feed, in response to the trigger operation on the target visual element in the video interface used for triggering resource transfer, a resource transfer trigger event back to the cloud through the first cloud connection channel.

The user may trigger a visual element in the video interface displayed through the cloud application. The terminal detects a trigger operation of the user, determines the visual element triggered by the user, and determines the visual element corresponding to the trigger operation as a target visual element. Then, the terminal may receive a resource transfer trigger event triggered by the trigger operation, and feed the resource transfer trigger event back to the cloud through the first cloud connection channel.

Operation 406. Receive, through a second cloud connection channel between the cloud application and the cloud, a resource transfer channel interface generated by the cloud in response to the resource transfer trigger event and display the resource transfer channel interface.

Resource transfer information is transmitted between the cloud application and the cloud through the second cloud connection channel. The cloud receives, through the first cloud connection channel, the resource transfer trigger event fed back by the cloud application. The terminal obtains a candidate resource transfer channel according to the resource transfer trigger event, and generates the resource transfer channel interface according to the candidate resource transfer channel. Then, the cloud transmits the resource transfer channel interface to the cloud application through the second cloud connection channel. The cloud application receives the resource transfer channel interface through the second cloud connection channel, and displays the resource transfer channel interface in the video interface of the cloud application.

In this embodiment, the cloud and the cloud application transmit an audio and video stream through the first cloud connection channel, thereby displaying, in the cloud application, the video interface generated according to the audio and video stream, and implementing real-time interaction between the user and the cloud. An application required for resource transfer is not installed in the conventional cloud, so that the cloud cannot directly invoke the resource transfer application to perform the resource transfer operation. However, in this embodiment, the second cloud connection channel is added to the cloud and the cloud application, to transmit resource transfer information through the second cloud connection channel. Through the second cloud connection channel, the cloud can invoke, based on the cloud application, various resource transfer channels outside the cloud to perform the resource transfer operation, so that during use of the cloud application, the user can also use various resource transfer channels to complete resource transfer.

In an embodiment, the displaying a target resource transfer channel in the resource transfer channel interface may include:

displaying, in the resource transfer channel interface in response to a selection operation on at least one candidate resource transfer channel in the resource transfer channel interface, the target resource transfer channel determined through the selection operation; and the method further includes: receiving, after the target resource transfer channel is determined, the resource transfer-related information corresponding to the target resource transfer channel and fed back by the cloud through the second cloud connection channel.

The terminal receives, through the second cloud connection channel between the cloud application and the cloud, the resource transfer channel interface generated by the cloud in response to the resource transfer trigger event. The terminal displays at least one candidate resource transfer channel in the resource transfer channel interface of the cloud application. The user may select any candidate resource transfer channel on the resource transfer channel interface. The terminal detects a selection operation of the user on the at least one candidate resource transfer channel, and displays, in the resource transfer channel interface, a target resource transfer channel determined through the selection operation.

After determining the target resource transfer channel, the cloud generates corresponding resource transfer-related information according to the target resource transfer channel, and returns the resource transfer-related information to the cloud application through the second cloud connection channel. The terminal receives the resource transfer-related information corresponding to the target resource transfer channel through the second cloud connection channel of the cloud application. Then, the terminal may display the resource transfer-related information in the video interface.

In this embodiment, the second cloud connection channel is added to the cloud and the cloud application, so that the cloud may transmit, through the second cloud connection channel, the resource transfer-related information used for performing resource transfer to the cloud application. Therefore, the cloud can invoke, based on the cloud application, various resource transfer channels outside the cloud to perform the resource transfer operation.

In an embodiment, the method further includes: obtaining a resource transfer result of the resource transfer operation after the resource transfer operation is performed; and feeding the resource transfer result back to the cloud through the second cloud connection channel.

The terminal performs the resource transfer operation based on the resource transfer-related information through the target resource transfer channel, and obtains the resource transfer result corresponding to the resource transfer operation after the resource transfer operation is performed. Then, the terminal feeds, based on the cloud application, the resource transfer result back to the cloud through the second cloud connection channel.

In this embodiment, the terminal may determine the resource transfer application corresponding to the target resource transfer channel, jump from the cloud application to the resource transfer application, and transfer the resource transfer-related information into the resource transfer application, to cause the resource transfer application to trigger the resource transfer operation based on the resource transfer-related information. Then, after the resource transfer application performs the resource transfer operation based on the resource transfer-related information, the resource transfer application generates the resource transfer result corresponding to the resource transfer operation. The terminal obtains the resource transfer result, and returns from the resource transfer application to the cloud application. The terminal feeds the resource transfer result back to the cloud through the second cloud connection channel of the cloud application, to complete invoking the external resource transfer application by the cloud.

In this embodiment, through the second cloud connection channel, the resource transfer result obtained after the cloud application performs the resource transfer operation is fed back to the cloud, to complete invoking the external resource transfer channel or the external resource transfer application by the cloud.

In an embodiment, the first cloud connection channel is connected to an application simulator of the cloud through a video stream parsing unit of the cloud application; and the second cloud connection channel is connected to a development kit integrated in the application simulator of the cloud through a development kit integrated in the cloud application.

An application simulator corresponding to the cloud application is installed in the cloud, and the application simulator encodes the running process of the cloud application into an audio and video stream through the cloud computing. A video stream parsing unit integrated in the cloud application may parse the audio and video stream, to convert the audio and video stream into the corresponding video interface.

The video stream parsing unit in the cloud application is connected to the application simulator of the cloud through the first cloud connection channel. The cloud transmits the audio and video stream to the video stream parsing unit in the cloud application through the first cloud connection channel, and the audio and video stream is parsed and converted into the corresponding video interface. The video interface is displayed through the cloud application.

In the conventional resource transfer manner of the cloud, the cloud can invoke only the internally supported resource transfer channel to implement the resource transfer operation, but cannot invoke the resource transfer channel outside the cloud. For example, an application required for resource transfer is not installed in the cloud, so that the cloud cannot directly invoke the resource transfer application to perform the resource transfer operation.

In this embodiment, the development kit is integrated in the application simulator of the cloud, the same development kit is integrated on the cloud application, and a persistent connection is implemented between the development kits through the second cloud connection channel. The development kit is a development kit required for resource transfer.

When the user needs to perform resource transfer, the development kit of the cloud generates resource transfer-related information corresponding to the resource transfer. The development kit of the cloud may transmit the resource transfer-related information corresponding to the resource transfer to the development kit on the cloud application through the second cloud connection channel. The development kit on the cloud application may invoke, according to the resource transfer-related information, the target resource transfer channel selected by the user to perform the resource transfer operation, so that the cloud may invoke, based on the cloud application, the external resource transfer channel to complete resource transfer. In addition, the invoking the external resource transfer channel by the cloud based on the cloud application can provide the user with a plurality of implementable resource transfer manners, to resolve the problem that the resource transfer manner of the cloud is undiversified.

In this embodiment, the development kit on the cloud application may jump, according to the resource transfer-related information, to the resource transfer application corresponding to the target resource transfer channel selected by the user, and perform the resource transfer operation through the resource transfer application, so that the cloud may invoke, based on the cloud application, the external resource transfer application to complete resource transfer. In addition, the invoking the external resource transfer application by the cloud based on the cloud application can provide the user with a plurality of implementable resource transfer manners, to resolve the problem that the cloud cannot invoke the external resource transfer application.

Figure 5A:
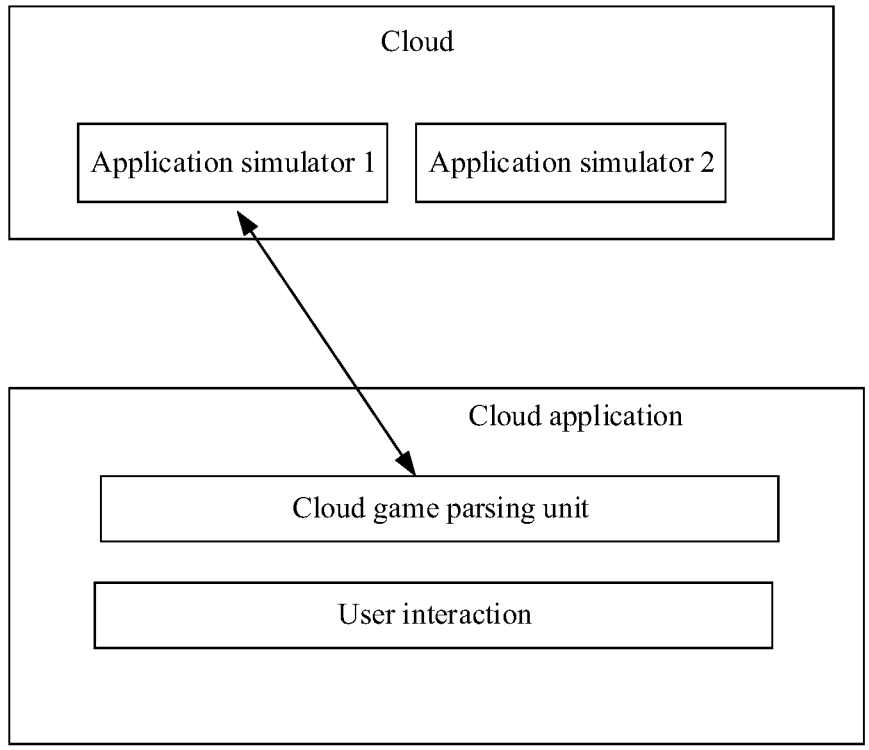
FIG. 5A is a conventional principle diagram of performing interaction between a cloud application and a cloud according to some embodiments.

FIG. 5A is a conventional principle diagram of performing interaction between a cloud application and a cloud. A plurality of application simulators are installed in the cloud, and each application simulator corresponds to a different type of cloud application. The cloud application is installed on a terminal, a video stream parsing unit is installed in the cloud application, and the cloud application provides an interface for interacting with a user. The video stream parsing unit is connected to the application simulator through a first cloud connection channel. When the user triggers a resource transfer operation, the cloud generates a resource transfer channel through the application simulator, and the resource transfer channel is a channel built in the cloud. However, the cloud cannot invoke each resource transfer application not installed on the cloud. In addition, the cloud cannot invoke a resource transfer channel corresponding to each resource transfer application not installed on the cloud either. As a result, the resource transfer operation of the user in the cloud application is limited by a cloud scenario.

Figure 5B:
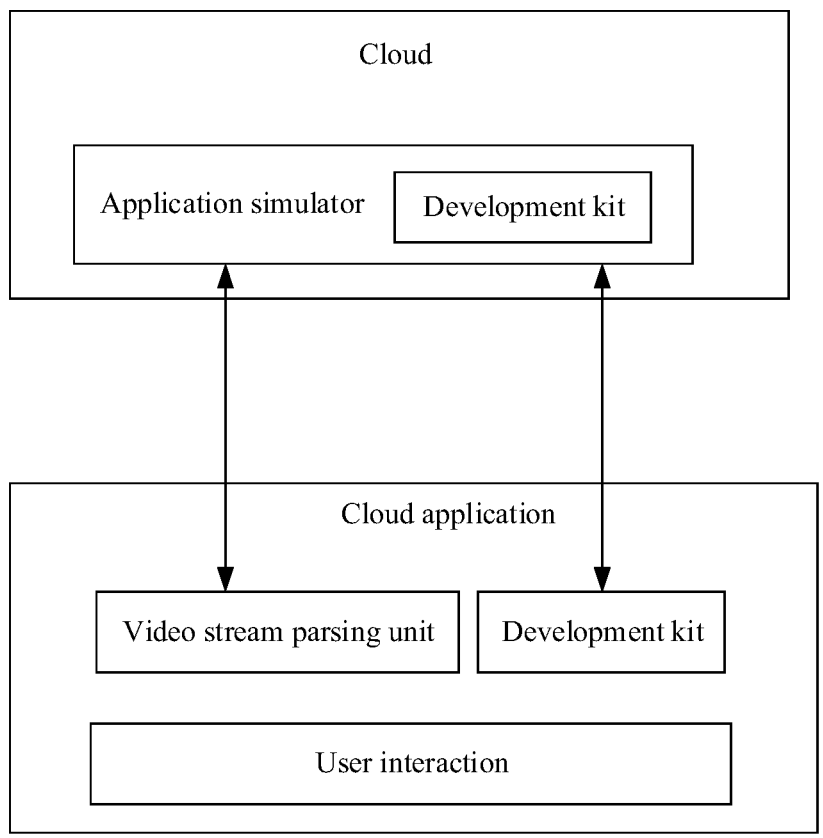
FIG. 5B is a principle diagram of a cloud application-based resource transfer method according to some embodiments.

FIG. 5B is a principle diagram of a cloud application-based resource transfer method in an embodiment. An application simulator is installed in a cloud, and a development kit used for resource transfer is installed in the application simulator. A cloud application is installed on a terminal, and a video stream parsing unit and a development kit that is used for resource transfer are installed in the cloud application. The video stream parsing unit is connected to the application simulator through a first cloud connection channel, and the development kit used for resource transfer in the application simulator is connected to the development kit used for resource transfer in the cloud application through a second cloud connection channel. The development kit used for resource transfer in the application simulator and the development kit used for resource transfer in the cloud application are the same development kit. The second cloud connection channel is a channel for performing a persistent connection between the development kit used for resource transfer in the cloud and the development kit used for resource transfer in the cloud application. A user interacts with the cloud application, the application simulator of the cloud encodes a running process of the cloud application into an audio and video stream, and feeds the audio and video stream back to the video stream parsing unit of the cloud application through the first cloud connection channel, so that the video stream parsing unit generates a corresponding video interface and the video interface is displayed to the user. The video stream parsing unit of the cloud application feeds an event triggered by a user operation back to the application simulator of the cloud through the first cloud connection channel, so that the application simulator of the cloud makes a corresponding response. In addition, the development kit of the cloud application feeds an event triggered by a resource transfer-related user operation back to the development kit of the cloud through the second cloud connection channel. The development kit of the cloud transmits resource transfer-related response information to the development kit of the cloud application through the second cloud connection channel. Through the cloud application-based resource transfer method in this embodiment, the cloud can invoke the resource transfer application not installed on the cloud to perform the resource transfer operation, and can also invoke the resource transfer channel not built in the cloud to perform the resource transfer operation, so that the resource transfer operation of the user in the cloud application is not limited by the cloud scenario.

Figure 6:
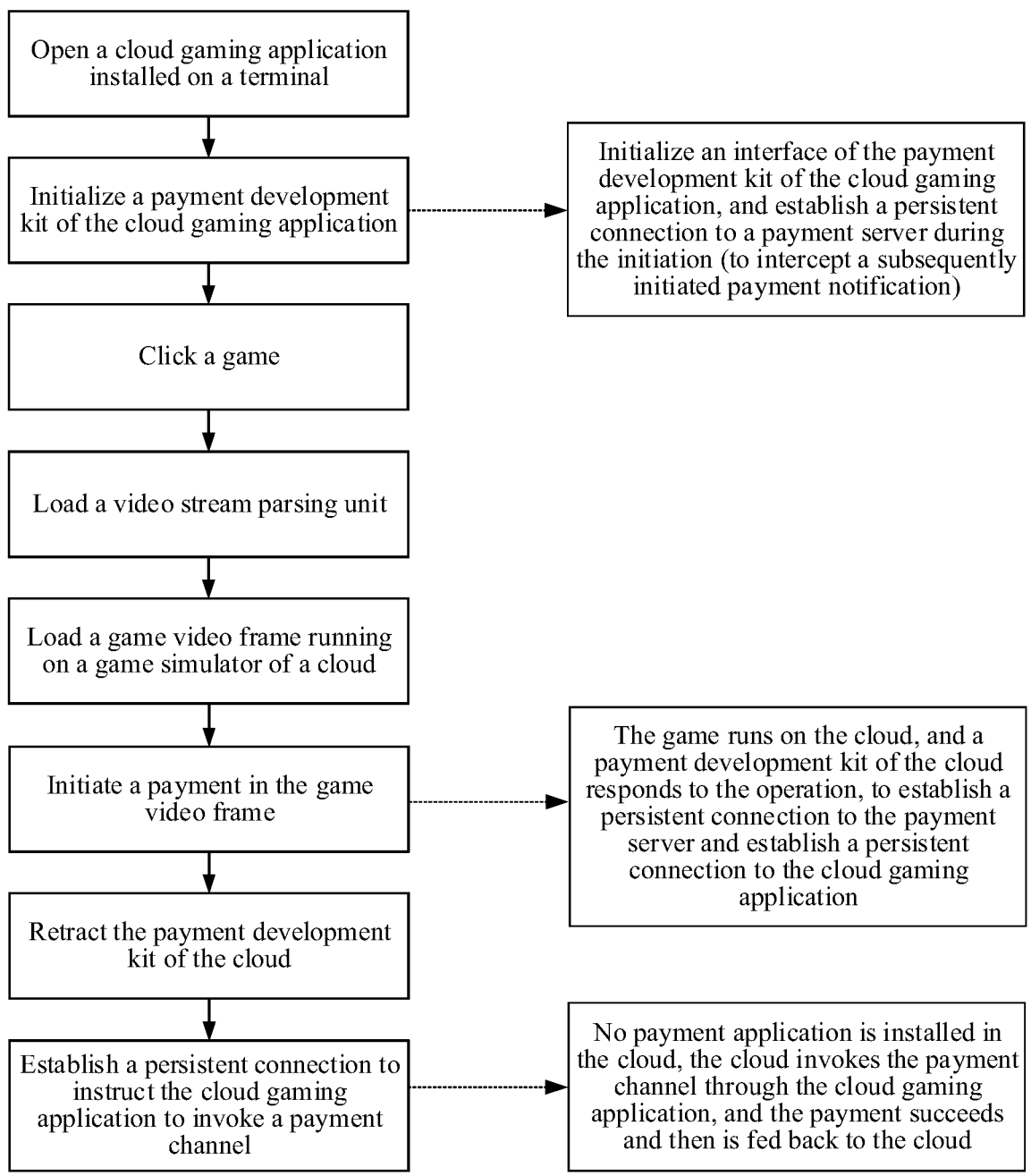
FIG. 6 is a schematic flowchart of a cloud gaming application-based resource transfer method according to some embodiments.

In an embodiment, as shown in FIG. 6, a cloud gaming application-based resource transfer method is provided, and includes:

A terminal runs a cloud gaming application on the terminal in response to a user operation. Then, the cloud gaming application invokes an interface of a payment SDK to perform initialization, thereby establishing a persistent connection to a payment server. The payment SDK of the cloud gaming application intercepts a subsequently initiated payment notification. Then, the terminal loads a video stream parsing unit in the cloud gaming application in response to trigger of the user on any game in the cloud gaming application. The cloud game runs on a game simulator of a cloud, and the terminal receives, through the video stream parsing unit, a game video frame running on the game simulator of the cloud, and displays the game video frame in the cloud gaming application, to form a game video interface. The terminal feeds, in response to a payment initiating operation triggered by the user in the game video frame, a payment initiating event back to the game simulator of the cloud. A payment SDK integrated on the game simulator of the cloud establishes, in response to the event, a persistent connection to the payment server, thereby implementing a persistent connection between the payment SDK of the cloud and the payment SDK of the cloud gaming application. The payment SDK of the cloud gaming application and the payment SDK of the game simulator of the cloud are the same, and are both, for example, Midas payment SDKs.

The payment SDK of the cloud generates a payment order according to the payment initiating event, and the payment order is fed back to the payment SDK of the cloud gaming application through the persistent connection. Then, the payment SDK of the cloud gaming application invokes a payment channel in the payment order, and pays a corresponding amount in the payment order through the payment channel. A payment result is generated after the payment is completed, and the payment SDK of the cloud gaming application feeds the payment result back to the payment SDK of the cloud, thereby completing the payment operation.

In this embodiment, the payment SDK of the cloud may obtain candidate payment channels according to the payment initiating event, and return the candidate payment channels to the payment SDK of the cloud gaming application. The cloud gaming application presents the candidate payment channels to the user. The payment SDK of the cloud gaming application feeds, in response to a selection operation of the user on the candidate payment channels, a selected target payment channel back to the payment SDK of the cloud. The payment SDK of the cloud generates a payment order according to the target payment channel, and the payment order is fed back to the payment SDK of the cloud gaming application through the persistent connection.

The same payment SDK is integrated in each of the cloud gaming application and the game simulator of the cloud, the user operates a video stream when playing the cloud game in the cloud gaming application, and the cloud game is actually installed and run in the cloud. Because application programs of the user such as WeChat, Alipay, QQ, direct debit, PayPal, okpay, and paysafecard are not installed or logged in to in the game simulator of the cloud, many payment channels cannot be used. Then, the game simulator of the cloud invokes the payment SDK interface, the payment SDK transfers a payment protocol to the cloud gaming application by establishing a persistent-connection channel for payment, and invokes a payment channel such as WeChat, Alipay, QQ, direct debit, PayPal, okpay, or paysafecard through the cloud gaming application to make a payment.

Figure 7:
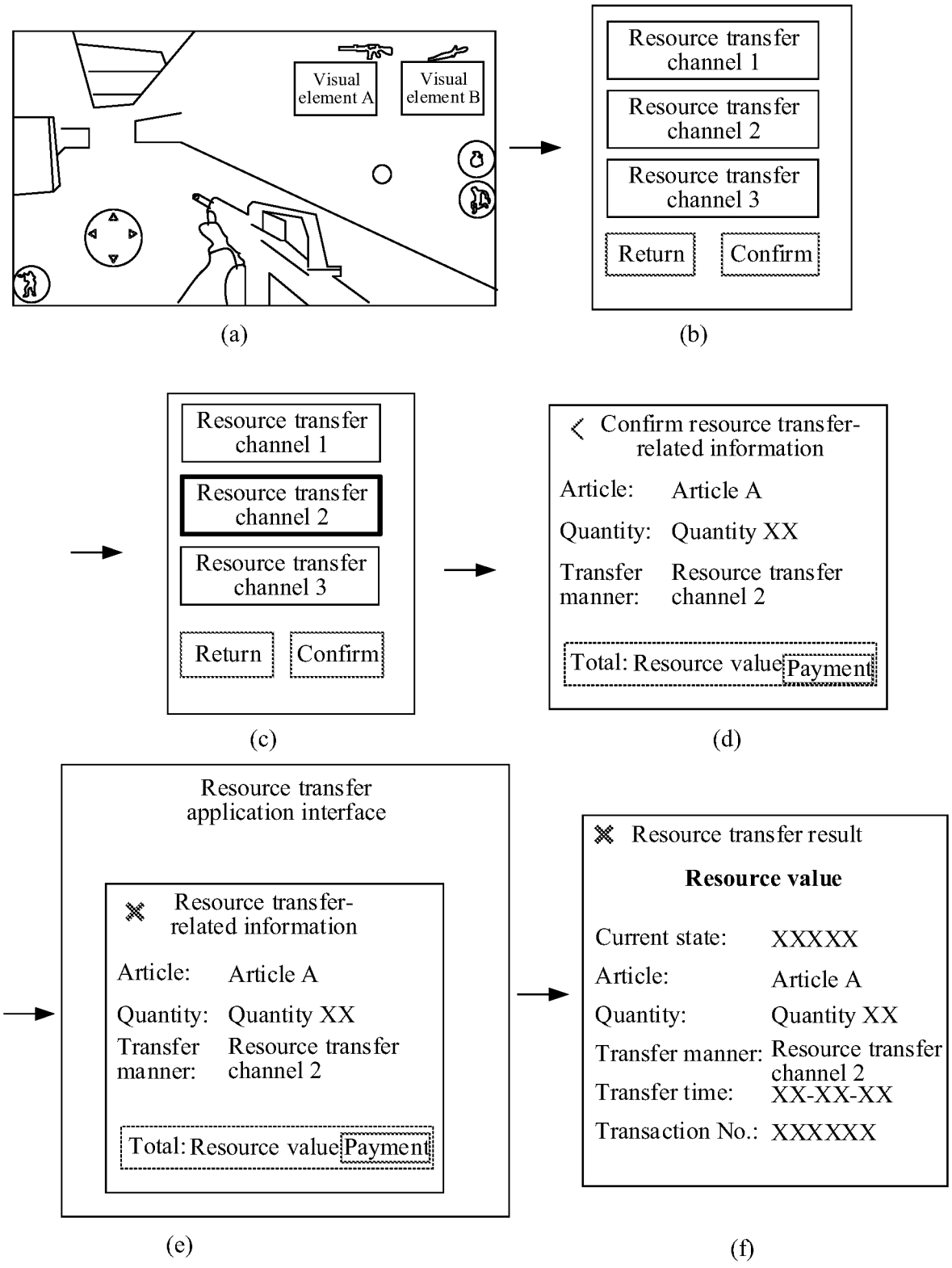
FIG. 7 is a schematic diagram of a resource transfer interface of a cloud gaming scene according to some embodiments.

In an embodiment, as shown in FIG. 7, the cloud application-based resource transfer method may be applied to a cloud gaming scene, and includes the following operations:

A user logs in to a cloud gaming application on a terminal through a user identifier, a game video interface generated after processing through a cloud is displayed through the cloud gaming application, and the game video interface is shown in (a) in FIG. 7.

The user may trigger a visual element in the game video interface shown in (a) in FIG. 7, thereby displaying a resource transfer channel interface generated by the cloud. Candidate resource transfer channels are displayed in the resource transfer channel interface, as shown in (b) in FIG. 7.

The user may select a target resource transfer channel, for example, "resource transfer channel 2" in the resource transfer channel interface shown in (b) in FIG. 7. The terminal triggers a resource transfer channel selection event in response to a selection operation on the candidate resource transfer channels; and the cloud displays the selected target resource transfer channel in the resource transfer channel interface in response to the resource transfer channel selection event, as shown in (c) in FIG. 7, and identifies the selected "resource transfer channel 2".

After the user confirms the selected target resource transfer channel, the cloud generates resource transfer-related information corresponding to the target resource transfer channel, and presents the resource transfer-related information on the cloud gaming application, as shown in (d) in FIG. 7.

When the user triggers a resource transfer confirmation operation for the resource transfer-related information, for example, the user taps "payment" shown in (d) in FIG. 7, the terminal determines a resource transfer application corresponding to the target resource transfer channel in response to the resource transfer confirmation operation for the resource transfer-related information. The terminal jumps from the cloud gaming application to the resource transfer application, and transfers the resource transfer-related information into the resource transfer application, and the resource transfer-related information is displayed in a resource transfer application interface, as shown in (e) in FIG. 7. The resource transfer application performs a resource transfer operation based on the resource transfer-related information, and generates a resource transfer result shown in (f) in FIG. 7. The cloud gaming application obtains the resource transfer result from the resource transfer application, and feeds the resource transfer result back to the cloud.

Figure 8:
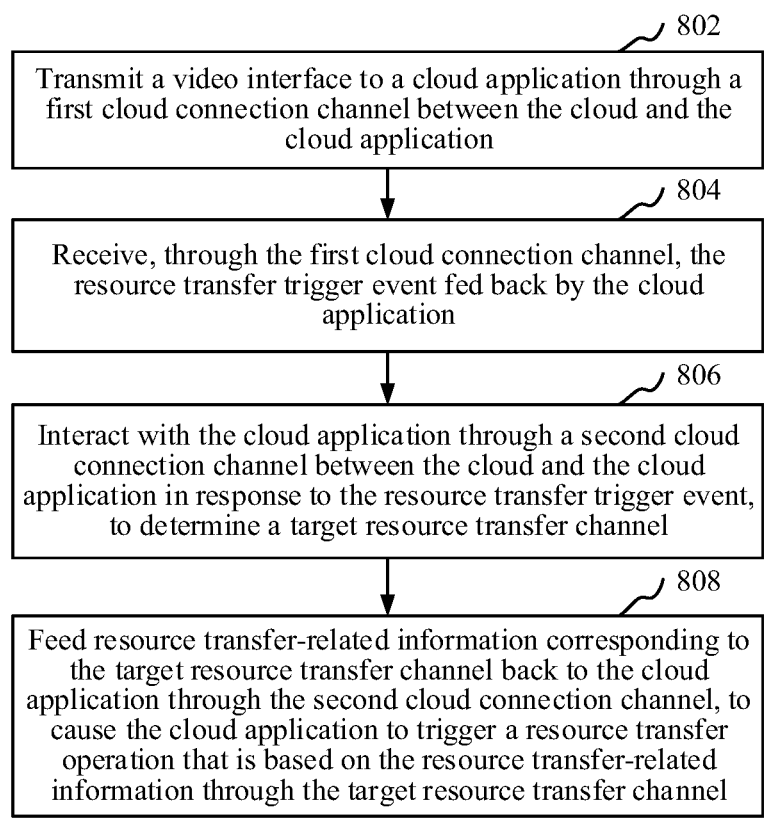
FIG. 8 is a schematic flowchart of a cloud application-based resource transfer method according to some embodiments.

In an embodiment, as shown in FIG. 8, a cloud application-based resource transfer method is provided, a description is made using an example in which the method is applied to the cloud in FIG. 1, and the method includes the following operations:

Operation 802. Transmit a video interface to a cloud application through a first cloud connection channel between the cloud and the cloud application.

Data transmission between the cloud and the cloud application is implemented through the first cloud connection channel. The user logs in to the cloud application on the terminal through the user identifier, and the cloud application feeds login information of the user back to the cloud through the first cloud connection channel. The cloud receives, through the first cloud connection channel, the information fed back by the cloud application, and encodes a running process of the cloud application into an audio and video stream based on the fed-back information. The cloud feeds a video interface corresponding to the audio and video stream back to the cloud application through the first cloud connection channel.

Operation 804. Receive, through the first cloud connection channel, the resource transfer trigger event fed back by the cloud application.

The cloud application feeds, in response to the trigger operation of the user on the target visual element in the video interface used for triggering resource transfer, a resource transfer trigger event back to the cloud through the first cloud connection channel. The cloud receives, through the first cloud connection channel, the resource transfer trigger event fed back by the cloud application.

Operation 806. Interact with the cloud application through a second cloud connection channel between the cloud and the cloud application in response to the resource transfer trigger event, to determine a target resource transfer channel.

The cloud obtains at least one candidate resource transfer channel corresponding to the resource trigger event according to the resource trigger event, and generates a resource transfer channel interface based on the at least one candidate resource transfer channel. Then, the cloud feeds the resource transfer channel interface back to the cloud application through the second cloud connection channel between the cloud and the cloud application. Then, after receiving a resource transfer channel selection event in response to the resource transfer channel interface fed back by the cloud application, the cloud determines the target resource transfer channel according to the resource transfer channel selection event.

Operation 808. Feed resource transfer-related information corresponding to the target resource transfer channel back to the cloud application through the second cloud connection channel, to cause the cloud application to trigger a resource transfer operation that is based on the resource transfer-related information through the target resource transfer channel.

The cloud determines the target resource transfer channel, and generates corresponding resource transfer-related information according to the target resource transfer channel. Then, the cloud may encrypt the resource transfer-related information, and feed the resource transfer-related information back to the cloud application through the second cloud connection channel according to a communication protocol of the second cloud connection channel.

The cloud application invokes, based on the resource transfer-related information, the target resource transfer channel to perform the resource transfer operation, or a resource transfer application corresponding to the target resource transfer channel to perform the resource transfer operation.

In this embodiment, the cloud processes the running process of the cloud application into an audio and video stream through the cloud computing, and displays the corresponding video interface through the cloud application, to implement interaction between the cloud and the user. The second cloud connection channel is added to the cloud and the cloud application, to feed a response for the resource transfer trigger event back to the cloud application through the second cloud connection channel, thereby exchanging the resource transfer-related information with the user through the second cloud connection channel. Resource transfer interaction with the user is performed through the second cloud connection channel, to determine the target resource transfer channel selected by the user, thereby generating the corresponding resource transfer-related information. The resource transfer-related information is fed back to the cloud application through the second cloud connection channel, so that the cloud can invoke, based on the cloud application, various external resource transfer channels and the resource transfer application of the cloud to perform the resource transfer operation. Therefore, resource transfer of the user in the cloud application scenario is not limited.

In an embodiment, the interacting with the cloud application through a second cloud connection channel between the cloud and the cloud application in response to the resource transfer trigger event, to determine a target resource transfer channel includes:

feeding a resource transfer channel interface back to the cloud application through the second cloud connection channel between the cloud and the cloud application in response to the resource transfer trigger event; and determining the target resource transfer channel after a resource transfer channel selection event in response to the resource transfer channel interface fed back by the cloud application is received through the second cloud connection channel.

The cloud receives, through the first cloud connection channel, the resource transfer trigger event fed back by the cloud application. The cloud obtains at least one candidate resource transfer channel based on the resource transfer trigger event, and generates the resource transfer channel interface. Then, the cloud feeds the generated resource transfer channel interface back to the cloud application through the second cloud connection channel.

The cloud application feeds, in response to the selection operation of the user on the resource transfer channel interface, the resource transfer channel selection event triggered by the selection operation back to the cloud through the second cloud connection channel. After receiving, through the second cloud connection channel, the resource transfer channel selection event fed back by the cloud application, the cloud determines, according to the resource transfer channel selection event, a candidate resource transfer channel selected by the user. The cloud determines the selected candidate resource transfer channel as the target resource transfer channel.

In this embodiment, the second cloud connection channel is added to the cloud and the cloud application, to transmit resource transfer-related information through the second cloud connection channel. Through the second cloud connection channel, the cloud can invoke, based on the cloud application, various resource transfer channels outside the cloud to perform the resource transfer operation, so that during use of the cloud application, the user can also use various resource transfer channels to complete resource transfer.

In an embodiment, the feeding resource transfer-related information corresponding to the target resource transfer channel back to the cloud application through the second cloud connection channel includes:

generating the resource transfer-related information for the target resource transfer channel through a development kit integrated in an application simulator of the cloud; and feeding, through the second cloud connection channel, the resource transfer-related information generated by the development kit integrated in the application simulator of the cloud back to a development kit integrated in the cloud application.

After receiving, from the second cloud connection channel through the internal application simulator, the resource transfer channel selection event returned by the cloud application, the cloud determines, according to the resource transfer channel selection event, the target resource transfer channel selected by the user. Then, the application simulator of the cloud transmits the target resource transfer channel to the development kit integrated in the application simulator. The development kit integrated in the application simulator generates the corresponding resource transfer-related information according to the target resource transfer channel. The resource transfer-related information may include an identifier of the cloud application, a user identifier, and an identifier of the target resource transfer channel. The development kit integrated in the application simulator of the cloud and the development kit integrated in the cloud application are the same development kit, and are connected through the second cloud connection channel.

Then, the development kit integrated in the application simulator feeds, through the second cloud connection channel, the resource transfer-related information back to the development kit integrated in the cloud application.

In this embodiment, identical development kits are added to the application simulator of the cloud and the cloud application, and are connected through the second cloud connection channel. When the resource transfer application is not installed in the cloud, the development kit integrated in the application simulator of the cloud generates, according to a user requirement, the resource transfer-related information used for performing resource transfer, and the cloud application may receive the resource transfer-related information through the development kit, and invoke an external resource transfer channel based on the resource transfer-related information, to execute a resource transfer instruction of the cloud. The same development kit is added to the cloud and the cloud application, so that the cloud can invoke various external resource transfer channels of the cloud based on the cloud application, thereby providing a plurality of resource transfer manners for the user in the cloud application scenario.

In an embodiment, the generating the resource transfer-related information for the target resource transfer channel through a development kit integrated in an application simulator of the cloud includes:

obtaining an identifier of the cloud application, a user identifier associated with the cloud application, and an identifier of the target resource transfer channel through the development kit integrated in the application simulator of the cloud; and generating the resource transfer-related information for the target resource transfer channel according to the identifier of the cloud application, the user identifier, and the identifier of the target resource transfer channel.

After receiving, from the second cloud connection channel through the internal application simulator, the resource transfer channel selection event returned by the cloud application, the cloud determines, according to the resource transfer channel selection event, the target resource transfer channel selected by the user. Then, the development kit integrated in the application simulator may obtain the identifier of the cloud application, the user identifier associated with the cloud application, and the identifier of the target resource transfer channel. The user identifier associated with the cloud application is a user identifier bound to the cloud application and being in a login state.

Then, the cloud generates, through the development kit integrated in the application simulator, the resource transfer-related information for the target resource transfer channel according to the identifier of the cloud application, the user identifier, and the identifier of the target resource transfer channel. The resource transfer-related information is fed, through the second cloud connection channel, back to the development kit integrated in the cloud application.

In this embodiment, the resource transfer-related information for the target resource transfer channel is generated through the identifier of the cloud application, the user identifier, and the identifier of the target resource transfer channel, so that the cloud application invokes the target resource transfer channel based on the resource transfer-related information to perform the resource transfer operation, thereby enabling the cloud to invoke, based on the development kit, a resource transfer channel not running in the cloud to complete resource transfer interaction with the user.

In an embodiment, the method further includes: receiving, through the second cloud connection channel, a resource transfer result fed back by the cloud application after the resource transfer operation is performed; updating a resource value in a resource account corresponding to the user identifier according to the resource transfer result; and feeding an updated resource value back to the cloud application through the second cloud connection channel.

The terminal performs the resource transfer operation based on the resource transfer-related information through the target resource transfer channel, and then obtains the resource transfer result corresponding to the resource transfer operation. Then, the terminal feeds, based on the cloud application, the resource transfer result back to the cloud through the second cloud connection channel. The cloud receives, through the second cloud connection channel, the resource transfer result fed back by the cloud application. Then, the cloud determines a resource account corresponding to the user identifier, and updates a resource value in the resource account based on the resource transfer result. Then, the cloud feeds an updated resource value back to the cloud application through the second cloud connection channel.

For example, if the resource transfer result is to transfer a value A to the resource account corresponding to the user identifier, the cloud obtains an original resource value in the resource account corresponding to the user identifier, and an updated resource value is obtained by adding the original resource value to the value A.

In this embodiment, after invoking, through the cloud application, the resource transfer channel not running in the cloud to perform the resource transfer operation, the cloud obtains the resource transfer result returned by the cloud application, to determine, according to the resource transfer result, whether the resource transfer operation is completed. In addition, the resource value in the resource account corresponding to the user identifier is updated in time according to the resource transfer result, thereby completing resource transfer interaction with the user.

In an embodiment, the method further includes: receiving, through the second cloud connection channel, a resource transfer result fed back by the cloud application after the resource transfer operation is performed.

The terminal performs the resource transfer operation based on the resource transfer-related information through the target resource transfer channel, and then obtains the resource transfer result corresponding to the resource transfer operation. Then, the terminal feeds, based on the cloud application, the resource transfer result back to the cloud through the second cloud connection channel. The cloud server receives, according to the second cloud connection channel of the cloud, the resource transfer result fed back by the cloud application, thereby completing invoking, by the cloud, the external resource transfer channel, so that the user can also use various resource transfer manners in the cloud application scenario.

In this embodiment, the terminal performs the resource transfer operation based on the resource transfer application corresponding to the target resource transfer channel, and obtains the corresponding resource transfer result. The terminal obtains the resource transfer result, and returns from the resource transfer application to the cloud application. The terminal feeds the resource transfer result back to the cloud through the second cloud connection channel of the cloud application. The cloud server receives, according to the second cloud connection channel of the cloud, the resource transfer result fed back by the cloud application, thereby completing invoking, by the cloud, the external resource transfer application. Through the manner in this embodiment, even if the resource transfer application is not installed in the cloud, the resource transfer application can still be invoked to complete the resource transfer operation, so that the user can also use various resource transfer applications in the cloud application scenario.

In this embodiment, the resource transfer result fed back by the cloud application after the resource transfer operation is performed is received through the second cloud connection channel, to complete invoking, by the cloud, the external resource transfer channel or the external resource transfer application.

In an embodiment, the first cloud connection channel is connected to an application simulator of the cloud through a video stream parsing unit of the cloud application; and the second cloud connection channel is connected to a development kit integrated in the application simulator of the cloud through a development kit integrated in the cloud application.

An application simulator corresponding to the cloud application is installed in the cloud, and the application simulator encodes the running process of the cloud application into an audio and video stream through the cloud computing. A video stream parsing unit integrated in the cloud application may parse the audio and video stream, to convert the audio and video stream into the corresponding video interface.

The video stream parsing unit in the cloud application is connected to the application simulator of the cloud through the first cloud connection channel. The cloud transmits the audio and video stream to the video stream parsing unit in the cloud application through the first cloud connection channel, and the audio and video stream is parsed and converted into the corresponding video interface. The video interface is displayed through the cloud application.

In the conventional resource transfer manner of the cloud, the cloud can invoke only the internally supported resource transfer channel to implement the resource transfer operation, but cannot invoke the resource transfer channel outside the cloud. For example, an application required for resource transfer is not installed in the cloud, so that the cloud cannot directly invoke the resource transfer application to perform the resource transfer operation.

In this embodiment, the development kit is integrated in the application simulator of the cloud, the same development kit is integrated on the cloud application, and a persistent connection is implemented through the second cloud connection channel. The development kit is a development kit required for resource transfer.

When the user needs to perform resource transfer, the development kit of the cloud generates resource transfer-related information corresponding to the resource transfer. The development kit of the cloud may transmit the resource transfer-related information corresponding to the resource transfer to the development kit on the cloud application through the second cloud connection channel. The development kit on the cloud application may invoke, according to the resource transfer-related information, the target resource transfer channel selected by the user to perform the resource transfer operation, so that the cloud may invoke, based on the cloud application, the external resource transfer channel to complete resource transfer. In addition, the invoking the external resource transfer channel by the cloud based on the cloud application can provide the user with a plurality of implementable resource transfer manners, to resolve the problem that the resource transfer manner of the cloud is undiversified.

In this embodiment, the development kit on the cloud application may jump, according to the resource transfer-related information, to the resource transfer application corresponding to the target resource transfer channel selected by the user, and perform the resource transfer operation through the resource transfer application, so that the cloud may invoke, based on the cloud application, the external resource transfer application to complete resource transfer. In addition, the invoking the external resource transfer application by the cloud based on the cloud application can provide the user with a plurality of implementable resource transfer manners, to resolve the problem that the cloud cannot invoke the external resource transfer application.

In an embodiment, when the terminal invokes, in a process that a first cloud application performs resource transfer using a target resource transfer channel, the target resource transfer channel through a second cloud application to trigger resource transfer, the terminal suspends a resource transfer operation of the first cloud application, and performs, in response to a resource transfer trigger operation of the second cloud application, a resource transfer operation of the second cloud application through the target resource transfer channel.

In an embodiment, if network abnormality occurs in the cloud application in the process of invoking the target resource transfer channel to perform resource transfer, the user is prompted through prompt information, to enter a corresponding procedure according to a user operation.

Figure 9:
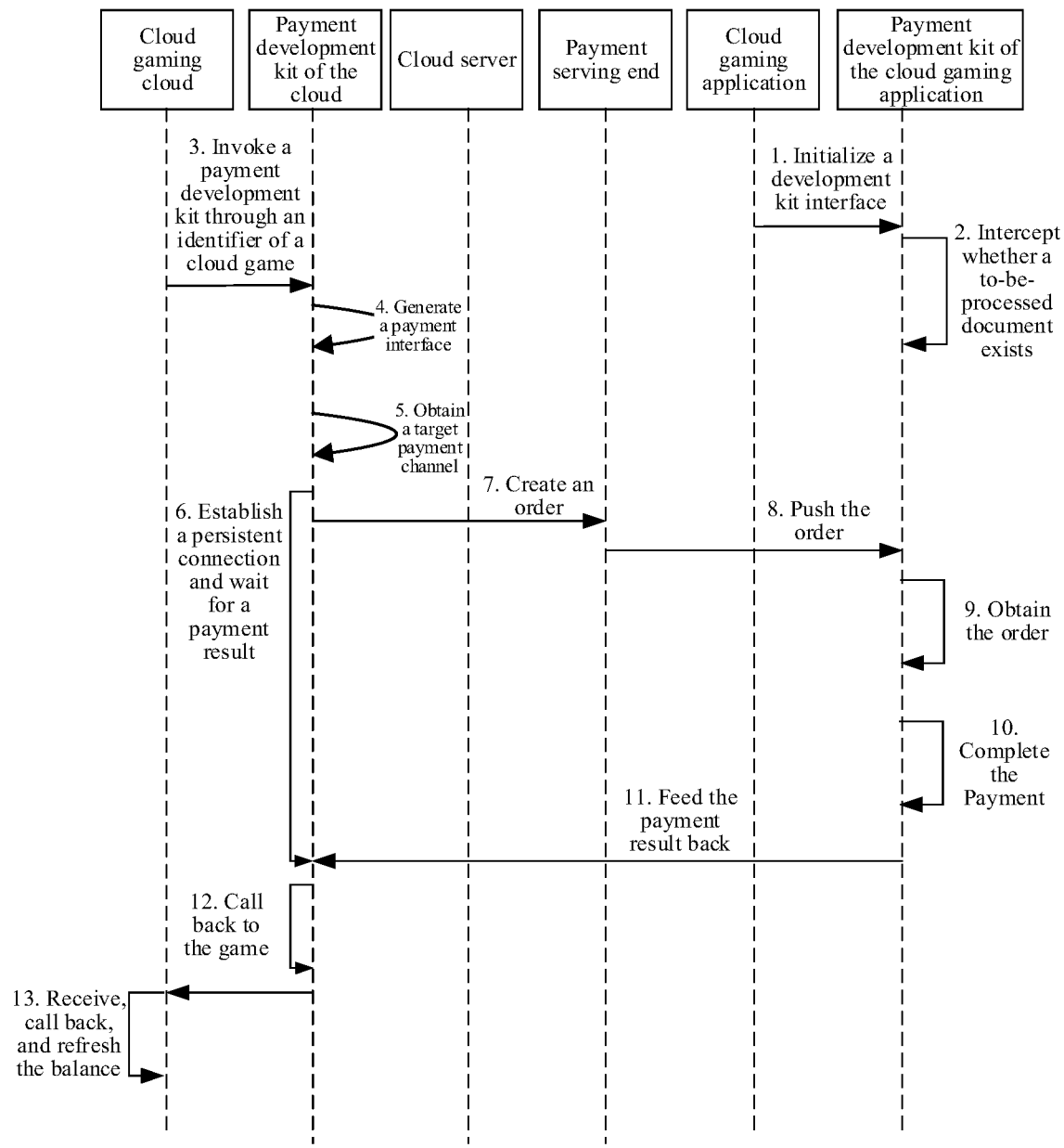
FIG. 9 is a sequence diagram of a cloud gaming application-based resource transfer method according to some embodiments.

In an embodiment, as shown in FIG. 9, a cloud gaming application-based resource transfer method is provided, and includes:

Operation 1. A cloud gaming cloud and a cloud gaming application both access a payment development kit (for example, both access a payment SDK of Midas). When a user starts the cloud gaming application, a terminal invokes the payment SDK of the cloud gaming application and initializes a payment SDK interface, to establish a persistent connection to a payment server and complete communication key verification, security verification, and other verification, thereby preparing for subsequent payment.

In the operation, the payment SDK determines, through an identifier of a cloud gaming platform or a system parameter of a cloud gaming platform transferred by the cloud gaming application, whether the platform on which a current game runs is on a cloud gaming simulator.

Operation 2. After being initialized, the payment SDK of the cloud gaming application begins to intercept order pushing information, to wait for beginning of payment.

Operation 3. The user starts a game simulator of the cloud gaming cloud through the cloud gaming application of the terminal to play the game. The user triggers a payment initiating operation in the game, and the cloud gaming application feeds the payment initiating operation back to the cloud. The cloud invokes the payment SDK of the cloud in response to the payment initiating operation.

Operation 4. The cloud invokes the payment SDK to obtain a payment channel, and generates a payment interface according to the payment channel (the payment interface is a resource transfer channel interface). The payment interface is transmitted to the cloud gaming application. The payment interface displays a plurality of candidate payment channels, for example, WeChat payment, hand q wallet, q coin, qq card, bank card payment, direct debit, PayPal, okpay, paysafecard, skrill, payza, perfectmoney, molpoints, and the like, and the foregoing payment channels may be partially displayed, or may be completely displayed, which is not much limited herein.

In the operation, the payment channel built in the cloud may be directly invoked in the SDK of the cloud, and the payment channel built in the cloud does not need to invoke a third-party payment application on the terminal. Therefore, the invoking may be completed in the cloud.

Operation 5. The user selects, from the candidate payment channels in the payment interface of the cloud gaming application, a target payment channel on which the third-party payment application needs to make a payment. The payment SDK of the cloud obtains the target payment channel selected by the user.

Operation 6. The payment SDK of the cloud establishes a persistent-connection channel, keeps connected to the payment SDK of the cloud gaming application, and prepares for intercepting a payment result.

Operation 7. The payment SDK of the cloud invokes an interface of a payment serving end to create an order, where parameters of the order carry an identifier of the cloud gaming application, a user openid identifier (user identifier) that needs to be pushed, and an identifier of the target payment channel, and are encrypted according to a payment protocol when the order is created.

Operation 8. After placing the order, the payment serving end pushes the order to the cloud gaming application according to a pushed protocol to initiate payment.

Operation 9. The payment SDK of the cloud gaming application obtains the pushed order, and decrypts the order.

Operation 10. The payment SDK of the cloud gaming application invokes the third-party payment application corresponding to the target payment channel, and the user completes payment in the third-party payment application.

Operation 11. The payment SDK of the cloud gaming application receives the payment result and calls back after the payment is completed. The payment SDK of the cloud gaming application feeds the payment result back to the payment SDK of the cloud.

Operation 12. The payment SDK of the cloud calls back to the cloud game according to the payment result.

Operation 13. The cloud refreshes a balance in a user account according to the payment result.

In this embodiment, by integrating the same payment SDK in each of the cloud gaming application and the game simulator of the cloud, when the user makes a payment in the cloud gaming application, the game simulator of the cloud invokes the interface of the payment SDK, and the payment SDK transfers the payment protocol to the cloud gaming application by establishing a persistent-connection channel for the payment, and invokes an external payment channel through the cloud gaming application to make the payment, so that the user can also select various payment channels to complete the payment in the cloud gaming scene, which is not limited by the cloud scenario.

In an embodiment, a cloud application-based resource transfer method is provided, a description is made using an example in which the cloud is specifically implemented through a cloud server, and the method includes:

The cloud server transmits a video interface to a cloud application through a first cloud connection channel between the cloud server and the cloud application.

A terminal receives and displays the video interface through the cloud application.

The terminal feeds, in response to a trigger operation on a target visual element in the video interface used for triggering resource transfer, a resource transfer trigger event back to the cloud server through the first cloud connection channel.

The cloud server receives, through the first cloud connection channel, the resource transfer trigger event fed back by the cloud application.

The cloud server feeds a resource transfer channel interface back to the cloud application through a second cloud connection channel between the cloud server and the cloud application in response to the resource transfer trigger event.

The terminal receives, through the second cloud connection channel between the cloud application and the cloud server, the resource transfer channel interface generated by the cloud server.

The terminal displays at least one candidate resource transfer channel in the resource transfer channel interface.

The terminal feeds, in response to a selection operation on the at least one candidate resource transfer channel, a resource transfer channel selection event back to the cloud server through the second cloud connection channel.

After receiving, through the second cloud connection channel, the resource transfer channel selection event fed back by the cloud application, the cloud server determines a target resource transfer channel according to the resource transfer channel selection event.

The cloud server feeds the target resource transfer channel back to the cloud application through the second cloud connection channel.

The terminal displays, in the resource transfer channel interface, the target resource transfer channel received through the second cloud connection channel.

The cloud server generates corresponding resource transfer-related information according to the target resource transfer channel, and feeds the resource transfer-related information back to the cloud application through the second cloud connection channel.

The terminal receives the resource transfer-related information corresponding to the target resource transfer channel and fed back by the cloud server through the second cloud connection channel.

The terminal displays the resource transfer-related information in the video interface.

The terminal determines a resource transfer application corresponding to the target resource transfer channel in response to the resource transfer confirmation operation for the resource transfer-related information.

The terminal jumps from the cloud application to the resource transfer application, and transfers the resource transfer-related information into the resource transfer application, to cause the resource transfer application to trigger the resource transfer operation based on the resource transfer-related information.

The terminal obtains a resource transfer result of the resource transfer operation after the resource transfer operation is performed.

The terminal feeds the resource transfer result back to the cloud server through the second cloud connection channel.

The cloud server receives, through the second cloud connection channel, a resource transfer result fed back by the cloud application after the resource transfer operation is performed.

The cloud server updates a resource value in a resource account corresponding to the user identifier according to the resource transfer result.

The cloud server feeds an updated resource value back to the cloud application through the second cloud connection channel.

In this embodiment, the cloud server and the cloud application transmit an audio and video stream through the first cloud connection channel, thereby displaying, in the cloud application, the video interface generated according to the audio and video stream, and implementing real-time interaction between the user and the cloud server. The second cloud connection channel is added to the cloud server and the cloud application, so that the cloud server and the cloud application may transmit information used for performing resource transfer to each other through the second cloud connection channel. After the user triggers the resource transfer confirmation operation, the resource transfer application is invoked through the cloud application to perform the resource transfer operation, so that the cloud server can invoke, through the cloud application, the resource transfer application not installed in the cloud server, to perform the resource transfer operation. The cloud server not only can use the internal resource transfer manner, but also can invoke the external resource transfer application or resource transfer channel, so that the user can use various resource transfer channels to complete resource transfer in the cloud application scenario.

After invoking, through the cloud application, the resource transfer application not running in the cloud server to perform the resource transfer operation, the cloud server obtains the resource transfer result returned by the cloud application, to determine, according to the resource transfer result, whether the resource transfer operation is completed. In addition, the resource value in the resource account corresponding to the user identifier is updated in time according to the resource transfer result, thereby completing resource transfer interaction with the user.

Although the operations of the flowcharts in FIG. 2 to FIG. 9 are shown sequentially according to arrows, the operations are not necessarily performed in the orders indicated by arrows. Unless clearly specified in this specification, there is no strict sequence limitation on the execution of the operations, and the operations may be performed in another sequence. Moreover, at least a part of the operations in FIG. 2 to FIG. 9 may include a plurality of operations or a plurality of stages. These operations or stages are not necessarily executed simultaneously, but may be executed at different times. The order of execution of these operations or stages is not necessarily performed sequentially, but may be performed in turn or alternately with other operations or at least a part of operations or stages of other operations.

Figure 10:
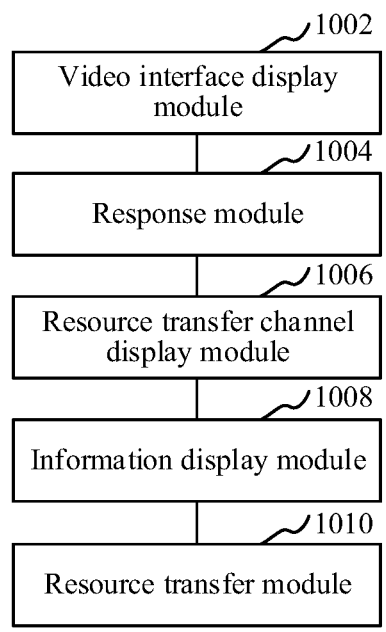
FIG. 10 is a structural block diagram of a cloud application-based resource transfer apparatus according to some embodiments.

In an embodiment, as shown in FIG. 10, a cloud application-based resource transfer apparatus is provided. The apparatus may be a software module, a hardware module, or a combination thereof as a part of a computer device. The apparatus specifically includes: a video interface display module 1002, a response module 1004, a resource transfer channel display module 1006, an information display module 1008, and a resource transfer module 1010.

The video interface display module 1002 is configured to display, through a cloud application, a video interface generated after processing through a cloud.

The response module 1004 is configured to display, in response to a trigger operation on a target visual element in the video interface used for triggering resource transfer, a resource transfer channel interface generated by the cloud.

The resource transfer channel display module 1006 is configured to display a target resource transfer channel in the resource transfer channel interface.

The information display module 1008 is configured to display resource transfer-related information corresponding to the target resource transfer channel and generated by the cloud.

The resource transfer module 1010 is configured to trigger, in response to a resource transfer confirmation operation for the resource transfer-related information, a resource transfer operation that is based on the resource transfer-related information through the target resource transfer channel.

In the foregoing cloud application-based resource transfer apparatus, the cloud processes the running process of the cloud application into an audio and video stream through the cloud computing, and displays the corresponding video interface through the cloud application, to implement interaction between the cloud and the user. When the user triggers the target visual element in the video interface used for triggering resource transfer, the cloud application feeds user operation information back to the cloud, so that the cloud generates the resource transfer channel interface, for the user to select the target resource transfer channel in the resource transfer channel interface. The cloud generates the corresponding resource transfer-related information according to the target resource transfer channel and returns the corresponding resource transfer-related information to the cloud application, so that the cloud can invoke the target resource transfer channel based on the cloud application to perform the resource transfer operation.

The conventional cloud can implement resource transfer only by using a resource transfer channel built in the cloud, but cannot invoke an external resource transfer channel. However, in this embodiment, the cloud can invoke, based on the cloud application, an external resource transfer channel and the resource transfer application not installed in the cloud to perform the resource transfer operation, thereby invoking the external resource transfer channel and the resource transfer application by the cloud, so that resource transfer of the user in the cloud application scenario is not limited by the cloud scenario.

In an embodiment, the resource transfer channel display module 1006 is further configured to: display at least one candidate resource transfer channel in the resource transfer channel interface; trigger a resource transfer channel selection event in response to a selection operation on the at least one candidate resource transfer channel; and display the selected target resource transfer channel after the cloud responds to the resource transfer channel selection event.

In this embodiment, a plurality of resource transfer channels are displayed in the resource transfer channel interface on the cloud application, and the user may autonomously select a required resource transfer manner. The cloud application feeds the event triggered by the selection operation of the user back to the cloud, so that the cloud can accurately determine, according to the triggered event, the resource transfer manner selected by the user, and the resource transfer manner selected by the user is displayed on the cloud application. Therefore, the user can implement resource transfer based on the cloud application, to implement real-time interaction between the user operation and the cloud running.

In an embodiment, the resource transfer channel display module 1006 is further configured to: display at least one candidate resource transfer channel in the resource transfer channel interface; and determine, in response to a selection operation on the at least one candidate resource transfer channel, a candidate resource transfer channel selected through the selection operation as the target resource transfer channel through a development kit integrated in the cloud application.

In this embodiment, the development kit is integrated in the cloud application, to determine, through the development kit, the target resource transfer channel selected by the user in the resource transfer channel interface, thereby implementing real-time interaction between the cloud application and the user through the development kit for resource transfer.

In an embodiment, the resource transfer module 1010 is further configured to: determine a resource transfer application corresponding to the target resource transfer channel in response to the resource transfer confirmation operation for the resource transfer-related information; and jump from the cloud application to the resource transfer application, and transfer the resource transfer-related information into the resource transfer application, to cause the resource transfer application to perform the resource transfer operation based on the resource transfer-related information.

In this embodiment, after the user triggers the resource transfer confirmation operation, the resource transfer application is invoked through the cloud application to perform the resource transfer operation, so that the cloud can invoke the resource transfer application through the cloud application to complete the resource transfer operation. The cloud can use an internal resource transfer manner, and can invoke the external resource transfer application, so that the user can use resource transfer manners in various forms in the cloud application scenario.

In an embodiment, the video interface display module 1002 is further configured to: receive, through a first cloud connection channel between the cloud application and the cloud, the video interface generated after the processing through the cloud and display the video interface; and the resource transfer module 1010 is further configured to: feed, in response to the trigger operation on the target visual element in the video interface used for triggering resource transfer, a resource transfer trigger event back to the cloud through the first cloud connection channel; and receive, through a second cloud connection channel between the cloud application and the cloud, a resource transfer channel interface generated by the cloud in response to the resource transfer trigger event and display the resource transfer channel interface.

In this embodiment, the cloud and the cloud application transmit an audio and video stream through the first cloud connection channel, thereby displaying, in the cloud application, the video interface generated according to the audio and video stream, and implementing real-time interaction between the user and the cloud. An application required for resource transfer is not installed in the conventional cloud, so that the cloud cannot directly invoke the resource transfer application to perform the resource transfer operation. However, in this embodiment, the second cloud connection channel is added to the cloud and the cloud application, to transmit resource transfer information through the second cloud connection channel. Through the second cloud connection channel, the cloud can invoke, based on the cloud application, various resource transfer channels outside the cloud to perform the resource transfer operation, so that during use of the cloud application, the user can also use various resource transfer channels to complete resource transfer.

In an embodiment, the resource transfer channel display module 1006 is further configured to: display, in the resource transfer channel interface in response to a selection operation on at least one candidate resource transfer channel in the resource transfer channel interface, the target resource transfer channel determined through the selection operation; and the information display module 1008 is further configured to: receive, after the target resource transfer channel is determined, the resource transfer-related information corresponding to the target resource transfer channel and fed back by the cloud through the second cloud connection channel.

In this embodiment, the second cloud connection channel is added to the cloud and the cloud application, so that the cloud may transmit, through the second cloud connection channel, the resource transfer-related information used for performing resource transfer to the cloud application. Therefore, the cloud can invoke, based on the cloud application, various resource transfer channels outside the cloud to perform the resource transfer operation.

In an embodiment, the apparatus further includes: a resource transfer result feedback module. The resource transfer result feedback module is configured to: obtain a resource transfer result of the resource transfer operation after the resource transfer operation is performed; and feed the resource transfer result back to the cloud through the second cloud connection channel.

In this embodiment, through the second cloud connection channel, the resource transfer result obtained after the cloud application performs the resource transfer operation is fed back to the cloud, to complete invoking the external resource transfer channel or the external resource transfer application by the cloud.

In an embodiment, the first cloud connection channel is connected to an application simulator of the cloud through a video stream parsing unit of the cloud application; and the second cloud connection channel is connected to a development kit integrated in the application simulator of the cloud through a development kit integrated in the cloud application.

In this embodiment, the development kit on the cloud application may jump, according to the resource transfer-related information, to the resource transfer application corresponding to the target resource transfer channel selected by the user, and perform the resource transfer operation through the resource transfer application, so that the cloud may invoke, based on the cloud application, the external resource transfer application to complete resource transfer. In addition, the invoking the external resource transfer application by the cloud based on the cloud application can provide the user with a plurality of implementable resource transfer manners, to resolve the problem that the cloud cannot invoke the external resource transfer application.

Figure 11:
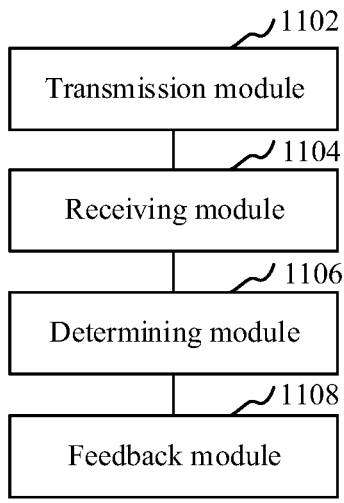
FIG. 11 is a structural block diagram of a cloud application-based resource transfer apparatus according to some embodiments.

In an embodiment, as shown in FIG. 11, a cloud application-based resource transfer apparatus is provided. The apparatus may be a software module, a hardware module, or a combination thereof as a part of a computer device. The apparatus specifically includes: a transmission module 1102, a receiving module 1104, a determining module 1106, and a feedback module 1108.

The transmission module 1102 is configured to transmit a video interface to a cloud application through a first cloud connection channel between the cloud and the cloud application.

The receiving module 1104 is configured to receive, through the first cloud connection channel, a resource transfer trigger event fed back by the cloud application.

The determining module 1106 is configured to interact with the cloud application through a second cloud connection channel between the cloud and the cloud application in response to the resource transfer trigger event, to determine a target resource transfer channel.

The feedback module 1108 is configured to feed resource transfer-related information corresponding to the target resource transfer channel back to the cloud application through the second cloud connection channel, to cause the cloud application to trigger a resource transfer operation that is based on the resource transfer-related information through the target resource transfer channel.

In this embodiment, the cloud processes the running process of the cloud application into an audio and video stream through the cloud computing, and displays the corresponding video interface through the cloud application, to implement interaction between the cloud and the user. The second cloud connection channel is added to the cloud and the cloud application, to feed a response for the resource transfer trigger event back to the cloud application through the second cloud connection channel, thereby exchanging the resource transfer-related information with the user through the second cloud connection channel. Resource transfer interaction with the user is performed through the second cloud connection channel, to determine the target resource transfer channel selected by the user, thereby generating the corresponding resource transfer-related information. The resource transfer-related information is fed back to the cloud application through the second cloud connection channel, so that the cloud can invoke, based on the cloud application, various external resource transfer channels and the resource transfer application of the cloud to perform the resource transfer operation. In addition, a plurality of resource transfer manners can be provided, so that resource transfer of the user in the cloud application scenario is not limited.

In an embodiment, the determining module 1106 is further configured to: feed a resource transfer channel interface back to the cloud application through the second cloud connection channel between the cloud and the cloud application in response to the resource transfer trigger event; and determine the target resource transfer channel after a resource transfer channel selection event in response to the resource transfer channel interface fed back by the cloud application is received through the second cloud connection channel.

In this embodiment, the second cloud connection channel is added to the cloud and the cloud application, to transmit resource transfer-related information through the second cloud connection channel. Through the second cloud connection channel, the cloud can invoke, based on the cloud application, various resource transfer channels outside the cloud to perform the resource transfer operation, so that during use of the cloud application, the user can also use various resource transfer channels to complete resource transfer.

In an embodiment, the feedback module 1108 is further configured to: generate the resource transfer-related information for the target resource transfer channel through a development kit integrated in an application simulator of the cloud; and feed, through the second cloud connection channel, the resource transfer-related information generated by the development kit integrated in the application simulator of the cloud back to a development kit integrated in the cloud application.

In this embodiment, identical development kits are added to the application simulator of the cloud and the cloud application, and are connected through the second cloud connection channel. When the resource transfer application is not installed in the cloud, the development kit integrated in the application simulator of the cloud generates, according to a user requirement, the resource transfer-related information used for performing resource transfer, and the cloud application may receive the resource transfer-related information through the development kit, and invoke an external resource transfer channel based on the resource transfer-related information, to execute a resource transfer instruction of the cloud. The same development kit is added to the cloud and the cloud application, so that the cloud can invoke various external resource transfer channels of the cloud based on the cloud application, thereby providing a plurality of resource transfer manners for the user in the cloud application scenario.

In an embodiment, the determining module 1106 is further configured to: obtain an identifier of the cloud application, a user identifier associated with the cloud application, and an identifier of the target resource transfer channel through the development kit integrated in the application simulator of the cloud; and generate the resource transfer-related information for the target resource transfer channel according to the identifier of the cloud application, the user identifier, and the identifier of the target resource transfer channel.

In this embodiment, the resource transfer-related information for the target resource transfer channel is generated through the identifier of the cloud application, the user identifier, and the identifier of the target resource transfer channel, so that the cloud application invokes the target resource transfer channel based on the resource transfer-related information to perform the resource transfer operation, thereby enabling the cloud to invoke, based on the development kit, a resource transfer channel not running in the cloud to complete resource transfer interaction with the user.

In an embodiment, the apparatus further includes: an update module. The update module is further configured to: receive, through the second cloud connection channel, a resource transfer result fed back by the cloud application after the resource transfer operation is performed; update a resource value in a resource account corresponding to the user identifier according to the resource transfer result; and feed an updated resource value back to the cloud application through the second cloud connection channel.

In this embodiment, after invoking, through the cloud application, the resource transfer channel not running in the cloud to perform the resource transfer operation, the cloud obtains the resource transfer result returned by the cloud application, to determine, according to the resource transfer result, whether the resource transfer operation is completed. In addition, the resource value in the resource account corresponding to the user identifier is updated in time according to the resource transfer result, thereby completing resource transfer interaction with the user.

In an embodiment, the feedback module 1108 is further configured to: receive, through the second cloud connection channel, a resource transfer result fed back by the cloud application after the resource transfer operation is performed.

In this embodiment, the resource transfer result fed back by the cloud application after the resource transfer operation is performed is received through the second cloud connection channel, to complete invoking, by the cloud, the external resource transfer channel or the external resource transfer application.

For a specific limitation on the cloud application-based resource transfer apparatus, refer to the limitation on the cloud application-based resource transfer method above. Details are not described herein again. The modules of the foregoing cloud application-based resource transfer apparatus may be implemented entirely or partly by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 12. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or wireless manner. The wireless communication may be implemented by Wi-Fi, an operator network, NFC (Near Field Communication), or other technologies. The computer program is executed by the processor to implement a cloud application-based resource transfer method. The display screen of the computer device may be a liquid crystal display or an electronic ink display screen. The input device of the computer device may be a touch layer that overlays the display screen, or may be a key, a trackball, or a touchpad disposed on the chassis of the computer device, or may be an external keyboard, touchpad or mouse or the like.

Figure 12:
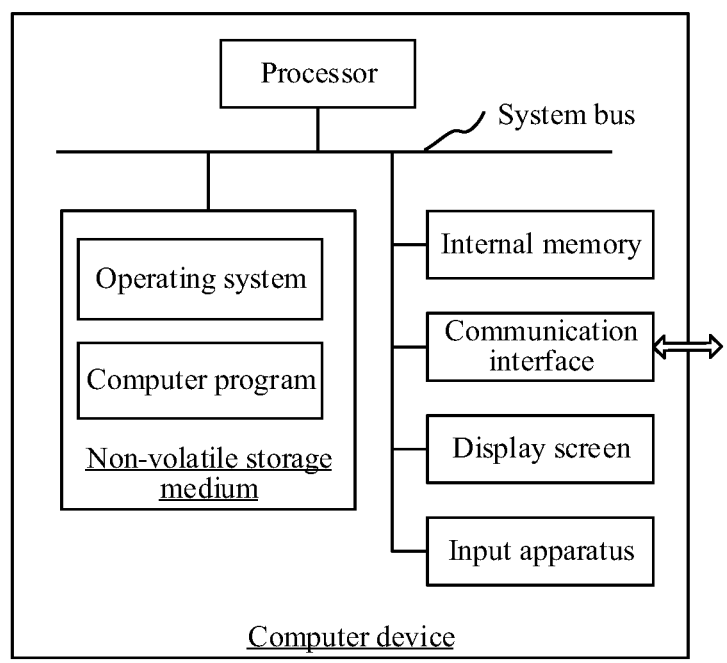
FIG. 12 is an internal structural diagram of a computer device according to some embodiments.

A person skilled in the art may understand that, the structure shown in FIG. 12 is only a block diagram of a part of a structure related to a solution of the disclosure and does not limit the computer device to which the solution of the disclosure is applied. Specifically, the computer device may include more or fewer members than those in the drawings, or include a combination of some members, or include different member layouts.

In an embodiment, a computer device is further provided, including a memory and one or more processors. The memory stores computer-readable instructions. When executed by the processor, the computer-readable instructions cause the processor to implement operations of the method embodiments described above.

In an embodiment, one or more non-transitory readable storage media storing computer-readable instructions are provided, the computer-readable instructions, when executed by one or more processors, causing the one or more processors to perform operations of the method embodiments described above.

In an embodiment, a computer program product or a computer program is provided. The computer program product or the computer program includes computer instructions, and the computer instructions are stored in a computer-readable storage medium. The processor of the computer device reads the computer instruction from the computer-readable storage medium. The processor executes the computer instruction to cause the computer device to perform the operations of the method embodiments.

A person of ordinary skill in the art may understand that all or some of procedures of the method in the foregoing embodiments may be implemented by a computer program instructing relevant hardware. The computer program may be stored in a non-volatile computer-readable storage medium or a non-transitory computer-readable storage medium. When the computer program is executed, the procedures of the foregoing method embodiments may be implemented. Any reference to a memory, a storage, a database, or another medium used in the embodiments provided in the disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The foregoing embodiments are merely intended for describing the technical solutions of the disclosure, but not for limiting the disclosure. Although the disclosure is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of the disclosure.

What is claimed is:

1. A cloud application-based resource transfer method, performed by a terminal, the method comprising:
    displaying, through a cloud application, a video interface generated after processing through a cloud;
    displaying, in response to a trigger operation on a target visual element in the video interface used for triggering resource transfer, a resource transfer channel interface generated by the cloud;
    displaying a target resource transfer channel in the resource transfer channel interface;
    displaying resource transfer-related information corresponding to the target resource transfer channel and generated by the cloud; and
    triggering, in response to a resource transfer confirmation operation for the resource transfer-related information, a resource transfer operation that is based on the resource transfer-related information through the target resource transfer channel.

2. The cloud application-based resource transfer method according to claim 1, wherein the displaying a target resource transfer channel in the resource transfer channel interface comprises:
displaying at least one candidate resource transfer channel in the resource transfer channel interface;
triggering a resource transfer channel selection event in response to a selection operation on the at least one candidate resource transfer channel; and
displaying the selected target resource transfer channel after the cloud responds to the resource transfer channel selection event.

3. The cloud application-based resource transfer method according to claim 1, wherein the displaying a target resource transfer channel in the resource transfer channel interface comprises:
displaying at least one candidate resource transfer channel in the resource transfer channel interface; and
determining, in response to a selection operation on the at least one candidate resource transfer channel, a candidate resource transfer channel selected through the selection operation as the target resource transfer channel through a development kit integrated in the cloud application.

4. The cloud application-based resource transfer method according to claim 1, wherein the triggering, in response to a resource transfer confirmation operation for the resource transfer-related information, a resource transfer operation that is based on the resource transfer-related information through the target resource transfer channel comprises:
determining a resource transfer application corresponding to the target resource transfer channel in response to the resource transfer confirmation operation for the resource transfer-related information; and
jumping from the cloud application to the resource transfer application, and transferring the resource transfer-related information into the resource transfer application, to cause the resource transfer application to perform the resource transfer operation based on the resource transfer-related information.

5. The cloud application-based resource transfer method according to claim 1, wherein the displaying, through a cloud application, a video interface generated after processing through a cloud comprises:
receiving, through a first cloud connection channel between the cloud application and the cloud, the video interface generated after the processing through the cloud and displaying the video interface; and
the displaying, in response to a trigger operation on a target visual element in the video interface used for triggering resource transfer, a resource transfer channel interface generated by the cloud comprises:
feeding, in response to the trigger operation on the target visual element in the video interface used for triggering resource transfer, a resource transfer trigger event back to the cloud through the first cloud connection channel; and
receiving, through a second cloud connection channel between the cloud application and the cloud, a resource transfer channel interface generated by the cloud in response to the resource transfer trigger event and displaying the resource transfer channel interface.

6. The cloud application-based resource transfer method according to claim 5, wherein the displaying a target resource transfer channel in the resource transfer channel interface comprises:
displaying, in response to a selection operation on at least one candidate resource transfer channel in the resource transfer channel interface, the target resource transfer channel determined through the selection operation; and
the method further comprises:
receiving, after the target resource transfer channel is determined, the resource transfer-related information corresponding to the target resource transfer channel and fed back by the cloud through the second cloud connection channel.

7. The cloud application-based resource transfer method according to claim 5, further comprising:
obtaining a resource transfer result of the resource transfer operation after the resource transfer operation is performed; and
feeding the resource transfer result back to the cloud through the second cloud connection channel.

8. The cloud application-based resource transfer method according to claim 5, wherein the first cloud connection channel is connected to an application simulator of the cloud through a video stream parsing unit of the cloud application; and the second cloud connection channel is connected to a development kit integrated in the application simulator of the cloud through a development kit integrated in the cloud application.

9. A cloud application-based resource transfer apparatus, comprising:
at least one memory configured to store program code; and
at least one processor configured to read the program code and operate as instructed by the program code, the program code comprising:
video interface display code configured to cause the at least one processor to display, through a cloud application, a video interface generated after processing through a cloud;
response code configured to cause the at least one processor to display, in response to a trigger operation on a target visual element in the video interface used for triggering resource transfer, a resource transfer channel interface generated by the cloud;
resource transfer channel display code configured to cause the at least one processor to display a target resource transfer channel in the resource transfer channel interface;
information display code configured to cause the at least one processor to display resource transfer-related information corresponding to the target resource transfer channel and generated by the cloud; and
resource transfer code configured to cause the at least one processor to trigger, in response to a resource transfer confirmation operation for the resource transfer-related information, a resource transfer operation that is based on the resource transfer-related information through the target resource transfer channel.

10. The cloud application-based resource transfer apparatus according to claim 9, wherein the resource transfer channel display code is further configured to cause the at least one processor to:
display at least one candidate resource transfer channel in the resource transfer channel interface;
trigger a resource transfer channel selection event in response to a selection operation on the at least one candidate resource transfer channel; and display the selected target resource transfer channel after the cloud responds to the resource transfer channel selection event.

11. The cloud application-based resource transfer apparatus according to claim 9, wherein the resource transfer channel display code is further configured to cause the at least one processor to:
display at least one candidate resource transfer channel in the resource transfer channel interface; and
determine, in response to a selection operation on the at least one candidate resource transfer channel, a candidate resource transfer channel selected through the selection operation as the target resource transfer channel through a development kit integrated in the cloud application.

12. The cloud application-based resource transfer apparatus according to claim 9, wherein the resource transfer code is further configured to cause the at least one processor to:
determine a resource transfer application corresponding to the target resource transfer channel in response to the resource transfer confirmation operation for the resource transfer-related information; and
jump from the cloud application to the resource transfer application, and transfer the resource transfer-related information into the resource transfer application, to cause the resource transfer application to perform the resource transfer operation based on the resource transfer-related information.

13. The cloud application-based resource transfer apparatus according to claim 9, wherein the video interface display code is further configured to cause the at least one processor to:
receive, through a first cloud connection channel between the cloud application and the cloud, the video interface generated after the processing through the cloud and display the video interface; and
the resource transfer code is further configured to cause the at least one processor to:
feed, in response to the trigger operation on the target visual element in the video interface used for triggering resource transfer, a resource transfer trigger event back to the cloud through the first cloud connection channel; and
receive, through a second cloud connection channel between the cloud application and the cloud, a resource transfer channel interface generated by the cloud in response to the resource transfer trigger event and display the resource transfer channel interface.

14. The cloud application-based resource transfer apparatus according to claim 13, wherein the resource transfer channel display code is further configured to cause the at least one processor to:
display, in response to a selection operation on at least one candidate resource transfer channel in the resource transfer channel interface, the target resource transfer channel determined through the selection operation; and
the information display code is further configured to cause the at least one processor to:
receive, after the target resource transfer channel is determined, the resource transfer-related information corresponding to the target resource transfer channel and fed back by the cloud through the second cloud connection channel.

15. The cloud application-based resource transfer apparatus according to claim 13, further comprising resource transfer result feedback code configured to cause the at least one processor to:
obtain a resource transfer result of the resource transfer operation after the resource transfer operation is performed; and
feed the resource transfer result back to the cloud through the second cloud connection channel.

16. The cloud application-based resource transfer apparatus according to claim 13, wherein the first cloud connection channel is connected to an application simulator of the cloud through a video stream parsing unit of the cloud application; and the second cloud connection channel is connected to a development kit integrated in the application simulator of the cloud through a development kit integrated in the cloud application.

17. A non-transitory computer-readable storage medium, storing a computer program that when executed by at least one processor causes the at least one processor to:
display, through a cloud application, a video interface generated after processing through a cloud;
display, in response to a trigger operation on a target visual element in the video interface used for triggering resource transfer, a resource transfer channel interface generated by the cloud;
display a target resource transfer channel in the resource transfer channel interface;
display resource transfer-related information corresponding to the target resource transfer channel and generated by the cloud; and
trigger, in response to a resource transfer confirmation operation for the resource transfer-related information, a resource transfer operation that is based on the resource transfer-related information through the target resource transfer channel.

18. The non-transitory computer-readable storage medium according to claim 17, wherein the display a target resource transfer channel in the resource transfer channel interface comprises:
displaying at least one candidate resource transfer channel in the resource transfer channel interface;
triggering a resource transfer channel selection event in response to a selection operation on the at least one candidate resource transfer channel; and
displaying the selected target resource transfer channel after the cloud responds to the resource transfer channel selection event.

19. The non-transitory computer-readable storage medium according to claim 17, wherein the display a target resource transfer channel in the resource transfer channel interface comprises:
displaying at least one candidate resource transfer channel in the resource transfer channel interface; and
determining, in response to a selection operation on the at least one candidate resource transfer channel, a candidate resource transfer channel selected through the selection operation as the target resource transfer channel through a development kit integrated in the cloud application.

20. The non-transitory computer-readable storage medium according to claim 17, wherein the trigger, in response to a resource transfer confirmation operation for the resource transfer-related information, a resource transfer operation that is based on the resource transfer-related information through the target resource transfer channel comprises:

determining a resource transfer application corresponding to the target resource transfer channel in response to the resource transfer confirmation operation for the resource transfer-related information; and jumping from the cloud application to the resource transfer application, and transferring the resource transfer-related information into the resource transfer application, to cause the resource transfer application to perform the resource transfer operation based on the resource transfer-related information.

\* \* \* \* \*